(12) United States Patent
Nolan et al.

(10) Patent No.: US 10,539,310 B2
(45) Date of Patent: Jan. 21, 2020

(54) HIGH INTENSITY LIGHT-EMITTING DIODE LUMINAIRE ASSEMBLY

(71) Applicant: Eaton Intelligent Power Limited, Dublin (IE)

(72) Inventors: Christopher Nolan, Syracuse, NY (US); Joseph Casper, Syracuse, NY (US); Joseph Witkowski, Syracuse, NY (US); Jonathan Hull, Syracuse, NY (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/492,342

(22) Filed: Apr. 20, 2017

(65) Prior Publication Data

US 2017/0219200 A1 Aug. 3, 2017

Related U.S. Application Data

(63) Continuation of application No. 14/364,803, filed as application No. PCT/US2012/069442 on Dec. 13, 2012, now Pat. No. 9,657,930.

(Continued)

(51) Int. Cl.
*F21V 23/00* (2015.01)
*F21V 29/74* (2015.01)
(Continued)

(52) U.S. Cl.
CPC .............. *F21V 23/009* (2013.01); *F21K 9/60* (2016.08); *F21S 2/00* (2013.01); *F21V 3/049* (2013.01);

(Continued)

(58) Field of Classification Search
CPC ........ F21V 29/75; F21V 31/005; F21V 17/12; F21V 29/89; F21V 3/049; F21V 21/14; F21V 23/005; F21V 23/009; F21V 29/74; F21V 5/007; F21V 29/70; F21V 29/773; F21V 21/08; F21V 23/0464; F21V 23/013; F21V 21/30; F21V 29/0471; F21V 15/013; F21V 23/0471; H05B 33/089; H05B 37/0281; H05B 33/0827; H05B 33/0845; H05B 33/0803; H05B 33/007;
(Continued)

(56) References Cited

U.S. PATENT DOCUMENTS 6,153,985 A 11/2000 Grossman
6,435,691 B1 8/2002 Macey et al.
(Continued)

FOREIGN PATENT DOCUMENTS

| CN | 102384452 A | * | 3/2012 | ............ F21V 29/004 |
| KR | 20030031339 A | | 4/2003 | |
| KR | 101011823 B1 | * | 2/2011 | .............. F21S 2/005 |

OTHER PUBLICATIONS

Machine English Translation of CN102384452A dated Mar. 21, 2012.*

*Primary Examiner* — Bao Q Truong
*Assistant Examiner* — Glenn D Zimmerman
(74) *Attorney, Agent, or Firm* — Fox Rothschild LLP

(57) ABSTRACT

A lighting device including a light emitting diode (LED) luminaire assembly and a bracket body. The bracket body includes at least one arm configured to support the LED luminaire assembly, and a cavity configured to receive a power supply.

18 Claims, 29 Drawing Sheets

Related U.S. Application Data

(60) Provisional application No. 61/570,072, filed on Dec. 13, 2011, provisional application No. 61/712,226, filed on Oct. 10, 2012.

(51) Int. Cl.

| | | |
|---|---|---|
| *F21K 9/60* | (2016.01) | |
| *F21S 2/00* | (2016.01) | |
| *H05B 33/08* | (2006.01) | |
| *F21V 5/00* | (2018.01) | |
| *F21V 29/75* | (2015.01) | |
| *F21V 29/89* | (2015.01) | |
| *F21V 3/04* | (2018.01) | |
| *F21V 17/12* | (2006.01) | |
| *F21V 21/14* | (2006.01) | |
| *F21V 31/00* | (2006.01) | |
| *H05B 37/02* | (2006.01) | |
| *F21V 29/70* | (2015.01) | |
| *F21V 29/77* | (2015.01) | |
| *F21Y 105/10* | (2016.01) | |
| *F21Y 115/10* | (2016.01) | |
| *F21K 9/00* | (2016.01) | |
| *F21V 15/01* | (2006.01) | |
| *F21V 21/08* | (2006.01) | |
| *F21V 23/04* | (2006.01) | |
| *F21V 21/30* | (2006.01) | |
| *F21Y 101/00* | (2016.01) | |

(52) U.S. Cl.
CPC .............. *F21V 5/007* (2013.01); *F21V 17/12* (2013.01); *F21V 21/14* (2013.01); *F21V 23/005* (2013.01); *F21V 29/74* (2015.01); *F21V 29/75* (2015.01); *F21V 29/89* (2015.01); *F21V 31/005* (2013.01); *H05B 33/0803* (2013.01); *H05B 33/089* (2013.01); *H05B 33/0827* (2013.01); *H05B 33/0845* (2013.01); *H05B 37/0281* (2013.01); *F21K 9/00* (2013.01); *F21V 15/013* (2013.01); *F21V 21/08* (2013.01); *F21V 21/30* (2013.01); *F21V 23/0464* (2013.01); *F21V 23/0471* (2013.01); *F21V 29/70* (2015.01); *F21V 29/773* (2015.01); *F21Y 2101/00* (2013.01); *F21Y 2105/10* (2016.08); *F21Y 2115/10* (2016.08)

(58) Field of Classification Search
CPC .............. F21Y 2115/10; F21Y 2105/10; F21Y 2101/00; F21S 2/00; F21K 9/60; F21K 9/00; F21K 9/69
USPC ....................................................... 362/235
See application file for complete search history.

(56) References Cited

U.S. PATENT DOCUMENTS

| | | | |
|---|---|---|---|
| 8,188,685 B1 | 5/2012 | Johnston | |
| 8,226,272 B2* | 7/2012 | Chen | F21L 4/027 362/294 |
| 9,657,930 B2* | 5/2017 | Nolan | F21V 5/007 |
| 2004/0062047 A1* | 4/2004 | Camarota | A47K 3/003 362/399 |
| 2005/0201098 A1* | 9/2005 | DiPenti | F21S 8/02 362/294 |
| 2005/0263777 A1 | 12/2005 | Yano et al. | |
| 2005/0265019 A1 | 12/2005 | Sommers et al. | |
| 2007/0262724 A1 | 11/2007 | Mednik et al. | |
| 2008/0025028 A1 | 1/2008 | Gloisten et al. | |
| 2008/0137333 A1 | 6/2008 | Tamaoki et al. | |
| 2008/0180967 A1* | 7/2008 | Totani | B60Q 1/0088 362/518 |
| 2008/0212319 A1 | 9/2008 | Klipstein | |
| 2009/0237934 A1* | 9/2009 | Zeng | F21V 21/30 362/249.03 |
| 2009/0278460 A1* | 11/2009 | Chen | F21K 9/00 315/112 |
| 2010/0117553 A1 | 5/2010 | Lee | |
| 2010/0171145 A1 | 7/2010 | Morgan et al. | |
| 2010/0208465 A1* | 8/2010 | Chien | F21S 6/003 362/294 |
| 2010/0321929 A1* | 12/2010 | Ramirez | F21V 19/0085 362/147 |
| 2011/0002120 A1* | 1/2011 | Song | F21S 2/005 362/249.02 |
| 2011/0050124 A1 | 3/2011 | Bailey et al. | |
| 2011/0075433 A1 | 3/2011 | Mart et al. | |
| 2011/0089865 A1* | 4/2011 | Wang | H05B 33/0827 315/297 |
| 2011/0095690 A1 | 4/2011 | Sagal | |
| 2011/0194287 A1* | 8/2011 | Georgitsis | B60Q 1/0483 362/277 |
| 2011/0228529 A1* | 9/2011 | Patel | F21V 3/02 362/235 |
| 2011/0255293 A1* | 10/2011 | Lipscomb | F21V 31/03 362/362 |
| 2011/0266972 A1* | 11/2011 | Ling | H05B 33/0827 315/297 |
| 2011/0310614 A1* | 12/2011 | Budike, Jr. | F21S 4/20 362/294 |
| 2012/0075833 A1* | 3/2012 | Le | F21V 29/15 362/84 |
| 2012/0182744 A1* | 7/2012 | Santiago | F21S 8/026 362/365 |
| 2012/0268952 A1* | 10/2012 | Newton | B23P 11/00 362/368 |
| 2012/0326614 A1* | 12/2012 | Tsuji | H05B 33/0845 315/200 R |
| 2013/0003372 A1* | 1/2013 | Dalsgaard | F21V 21/30 362/249.1 |
| 2013/0027923 A1* | 1/2013 | Ramirez | F21S 8/03 362/208 |
| 2013/0193592 A1* | 8/2013 | Peil | F21K 9/00 257/791 |
| 2013/0249375 A1 | 9/2013 | Panagotacos et al. | |
| 2013/0322062 A1* | 12/2013 | Danesh | F21V 21/04 362/157 |

* cited by examiner

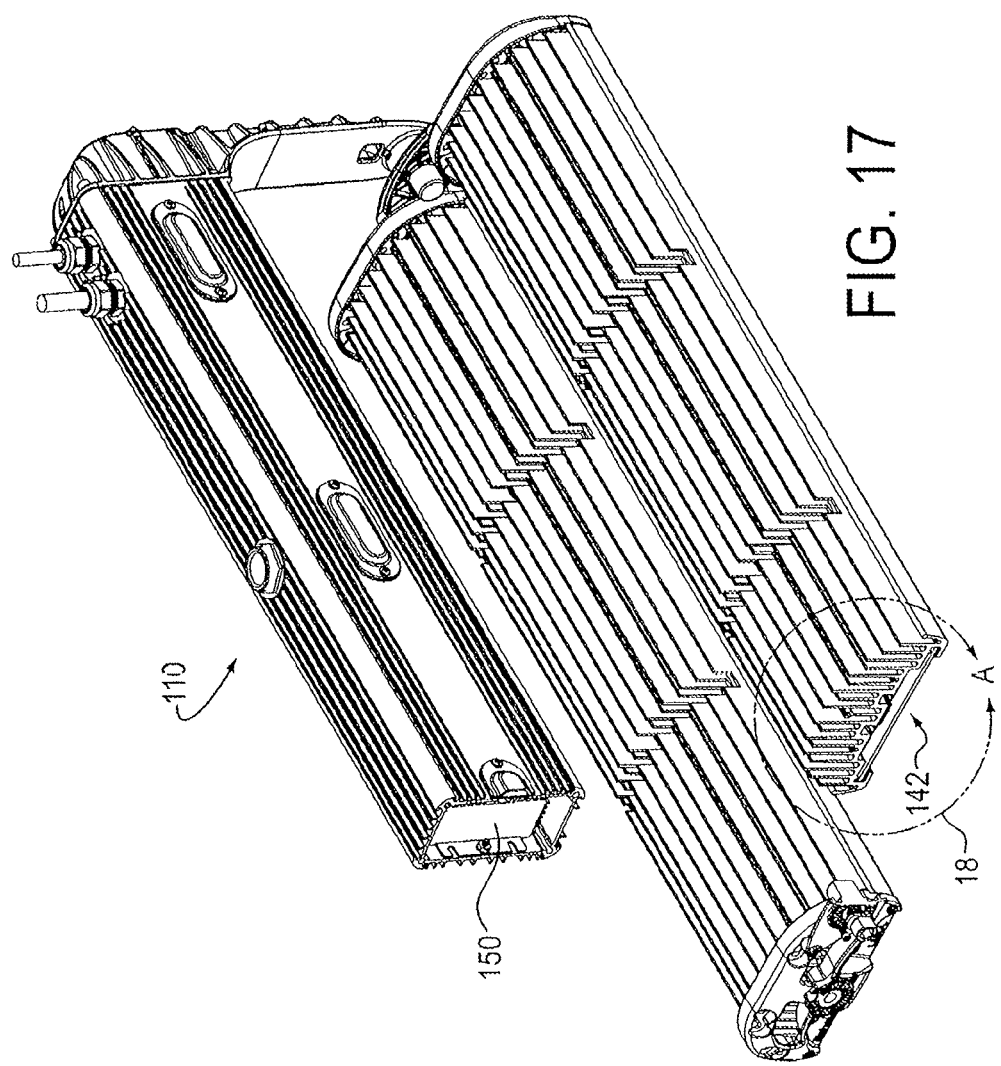

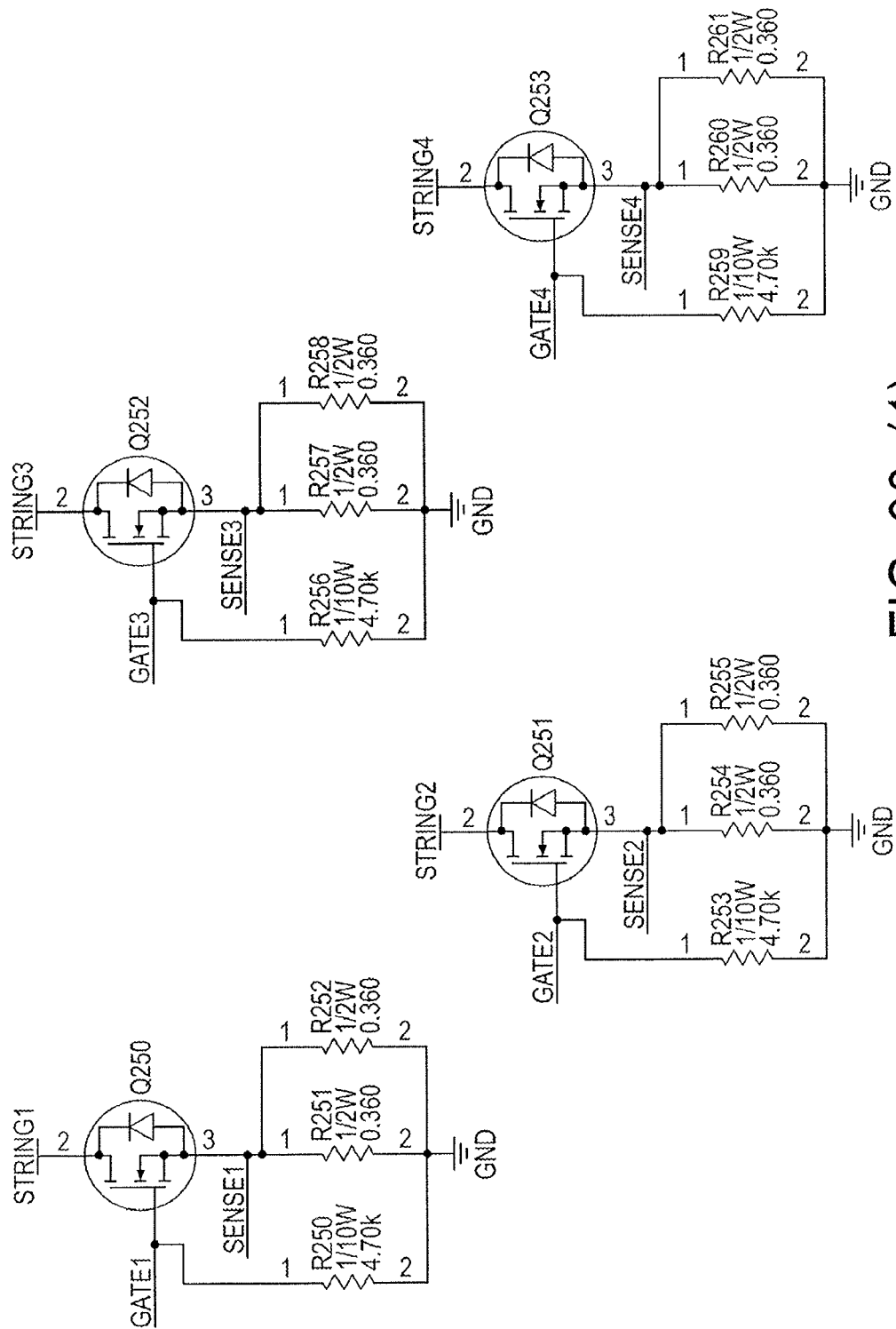
FIG. 30c(1)

HIGH INTENSITY LIGHT-EMITTING DIODE LUMINAIRE ASSEMBLY

CROSS-REFERENCE TO RELATED APPLICATIONS

This application claims priority to and is a continuation of U.S. patent application Ser. No. 14/364,803, filed Jun. 12, 2014, which is a national stage application of, and claims priority to International Patent Application No. PCT/US2012/069442, filed Dec. 13, 2012, which in turn claims priority to (i) U.S. Provisional Patent Application No. 61/570,072, filed Dec. 13, 2011 and (ii) U.S. Provisional Patent Application No. 61/712,226, filed Oct. 10, 2012, each of which is incorporated herein by reference in its entirety.

TECHNICAL FIELD

The present invention relates to high intensity light-emitting diode (LED) array technology. The invention further relates high intensity LED luminaires and high intensity LED luminaire (HILL) assemblies and methods for making them.

BACKGROUND OF THE INVENTION

High intensity light-emitting diode (LED) array technology is currently used to provide lighting in a wide range of applications in which the user needs high intensity illumination.

One drawback of existing high intensity LED luminaire (HILL) assemblies (also known as high intensity LED light fixtures or high intensity LED light fittings) is poor thermal management, which drastically reduces product lifespan. Extended operation of LEDs at temperatures significantly above ambient is not possible with existing HILL designs, yet such assemblies throw off large amounts of heat which are not adequately dispersed.

Another drawback of existing luminaire or HILL assemblies is their "throw-away" design. Lack of in-field serviceability leads to disposal of the entire luminaire assembly rather than replacing its electronics. This wastes resources, since many components that are still serviceable. Furthermore, existing HILLs lack balanced current control and can be prone to "thermal runaway," which in turn can cause premature failure of the luminaire and shorten its lifespan.

Another drawback of existing HILLs is off-angle glare: when an overhead luminaire is operating, users at ground level see spikes of light intensity emitted by the luminaire, rather than consistent and even illumination over the entire illuminated field.

Citation or identification of any reference in Section 2, or in any other section of this application, shall not be considered an admission that such reference is available as prior art to the present invention.

SUMMARY OF THE INVENTION

In an embodiment, a lighting device may include a light emitting diode (LED) luminaire assembly and a bracket body. The bracket body may include at least one arm configured to support the LED luminaire assembly, and a cavity configured to receive a power supply.

In certain embodiments, the LED luminaire assembly may include at least one LED module consisting of a plurality of LEDs and configured to attach to a heatsink housing. The LED luminaire assembly may also include a circuit board and driver circuitry for driving the plurality of LEDs in communication with the circuit board. The at least one LED module may include a plurality of parallel strings of LEDs and the driver circuitry may be configured to provide a constant current to the at least one LED module so that voltage delivered to each string of LEDs is automatically adjusted if any LED in the string fails. The driver circuitry may also include pulse width modulation circuitry configured to enable dimming of the plurality of LEDs by varying pulse width modulation. Alternatively and/or additionally, the driver circuitry may further include feedback circuitry for balancing power input to each of a plurality of LED strings.

In one or more embodiments, the at least bracket arm may be configured to connect to the LED luminaire assembly via one or more of the following: an endcap or a joiner. The bracket body may also be configured for multiple angular mounting options.

In some embodiments, the at least one bracket arm may be configured to enclose circuitry for the power supply.

In an embodiment, the cavity may include a power supply casing for receiving the power supply and that is configured to function as a heatsink for the power supply.

In certain embodiments, the power supply comprises at least one DC power supply. The DC power supply may include a DC-DC converter for converting incoming voltage from about 390 V to 12 V DC operating voltage.

In an embodiment, a mounting bracket for a lighting device may include at least one arm configured to support a lighting device, and a cavity configured to receive a power supply for the lighting device. The at least one bracket arm is may be configured to enclose circuitry for the power supply.

In one or more embodiments, the at least bracket arm may be configured to connect to the LED luminaire assembly via one or more of the following: an endcap or a joiner. The bracket body may also be configured for multiple angular mounting options.

BRIEF DESCRIPTION OF THE DRAWINGS

The present invention is described herein with reference to the accompanying drawings, in which similar reference characters denote similar elements throughout the several views. It is to be understood that in some instances, various aspects of the invention may be shown exaggerated, enlarged, exploded, or incomplete to facilitate an understanding of the invention.

FIG. 17 is a view like that shown in FIG. 15 showing a portion of one bank of LED lamp assembly cutaway.

DETAILED DESCRIPTION OF THE INVENTION

Figure 1:
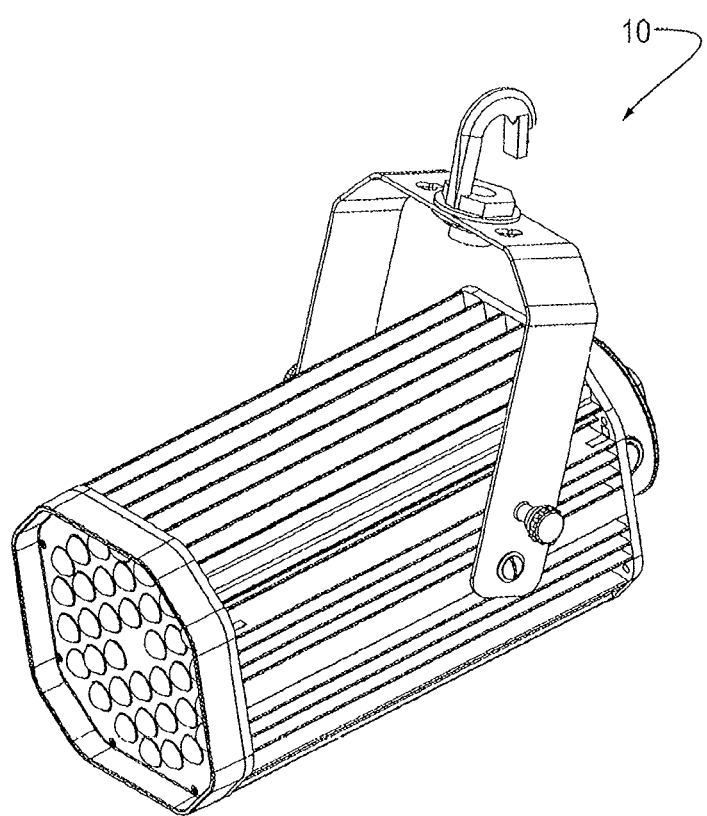
FIG. 1 is a perspective drawing of a first embodiment of a HILL assembly in accordance with the present invention.

A high intensity LED luminaire (HILL) assembly (also known in the art as a high intensity LED light fixture, high intensity LED light fitting or LED luminaire) is provided. The HILL assembly can be used indoors or outdoors, and in wet, damp or dry environments. In various embodiments, the HILL can be powered by a universal AC (90-480 VAC, 47-440 Hz) or a DC (12-480 VDC) electrical supply. The operational temperature range for the HILL is from about −40° C. to about +80° C. In a preferred embodiment, the HILL assembly comprises a heatsink, referred to herein as a "heatsink housing," that serves the dual purpose of functioning as the housing for the HILL assembly and as the heatsink for the HILL assembly.

A HILL assembly in accordance with a first embodiment of the present invention can comprise a LED module that is replaceable (or exchangeable or interchangeable) having a plurality of LEDs disposed in a LED array; an array of concavo-convex lenses (CCLs, also known in the art as "concave meniscus" lenses) disposed adjacent to the LED array; a thermal insulator; a heatsink housing; a power supply and associated circuitry; and a circuit board for controlling the LED array by thermal via technology. The LEDs are mounted directly on the circuit board. A first embodiment HILL assembly is well adapted for use, for example, as a floodlight, spotlight, worklight, or hand-held flashlight.

In a second embodiment, the LEDs are arranged in a circular or rectilinear modular array. Modules in the modular array may be ganged together into larger units for use in, for example, overhead room lighting, desk lighting, street lighting, or stadium lighting. Lenses can be adjustable to vary the size and shape of the field illuminated by each LED. In certain embodiment, the power supply driving circuitry can be positioned or mounted directly on the circuit board.

In various embodiments, the HILL assembly can be used for lighting indoor or outdoor areas or for flood lighting. It can be used in high bay or low bay applications. It will be apparent to the skilled artisan that the HILL assembly has many uses for illuminating commercial or industrial settings, but can also be used in residential settings. The commercial or industrial settings in which the HILL assembly can be used can include, but are not limited to, offices, manufacturing facilities, warehouses, parking garages, ball parks, stadiums, and storage areas.

For clarity of disclosure, and not by way of limitation, the detailed description of the invention is divided into the subsections set forth below.

5.1. High Intensity LED Luminaire (HILL) Assembly—First Embodiment

Referring now to FIGS. 1-16, a first embodiment 10 of a HILL assembly in accordance with the present invention comprises at least a secondary lens element 12 comprising a plurality of CCLs 14; a LED module 16, comprising a plurality of LEDs 18 equal in number to the number of CCLs 14, positioned in a first LED array 20; a heatsink (also referred to herein as a heatsink housing) 22; and a power supply 24 disposed within heatsink housing 22. Embodiment 10 further comprises a first O-ring 28; first and second thermal gaskets 30; an interface plate 32; a second O-ring 34 for sealing heatsink housing 22 at the front end; a third O-ring 36 for sealing heatsink housing 22 at the rear end; a back plate 38; a junction box 40; and sealing gaskets 42.

Lens Element

Figure 4:
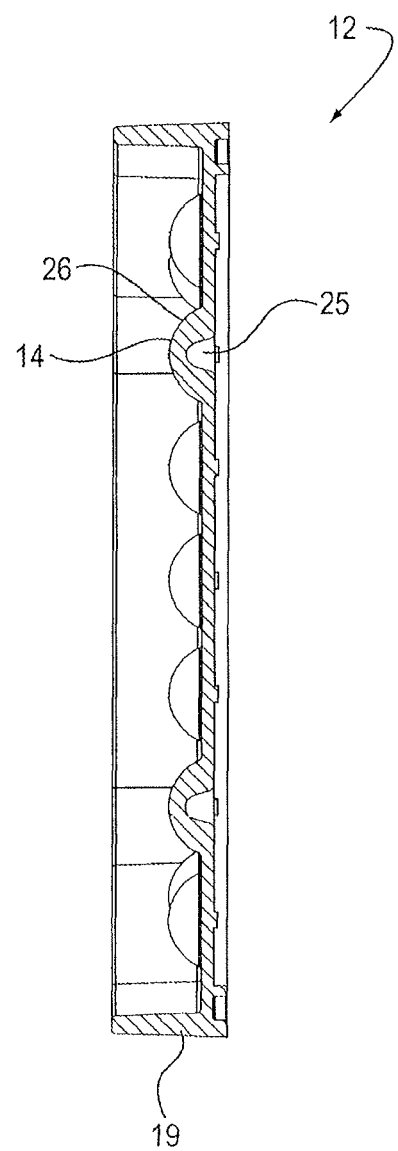
FIG. 4 is a cross-sectional view taken along line 4-4 in FIG. 3.

HILL assembly 10 comprises a single secondary lens element 12 (FIGS. 2-3) with one or more CCLs 14 integrated into the lens element. Lens element 12 is also referred to herein as a secondary lens, because the primary lens is a part of the actual LED chip itself. Lens element 12 is preferably made of injection molded plastic, and more preferably, a high temperature acrylic. Other materials, such as borosilicate glass or an optical grade polyycarbonate, can also be used. In first embodiment 10, lens element 12 can comprise a plurality of CCLs 14 (in this embodiment, 36 in number, see FIGS. 1-3) integrated into a singular lens element. As shown in FIG. 4, the concave lens surface 25 of each CCL 14, in combination with the convex lens surface 26 of the CCL, creates wide dispersion optics. After assembly of embodiment 10, each LED 18 is positioned within the concavity of one of the concave surfaces 24 when the lens element 12 is positioned on or attached to the LED array 20

Figure 5:
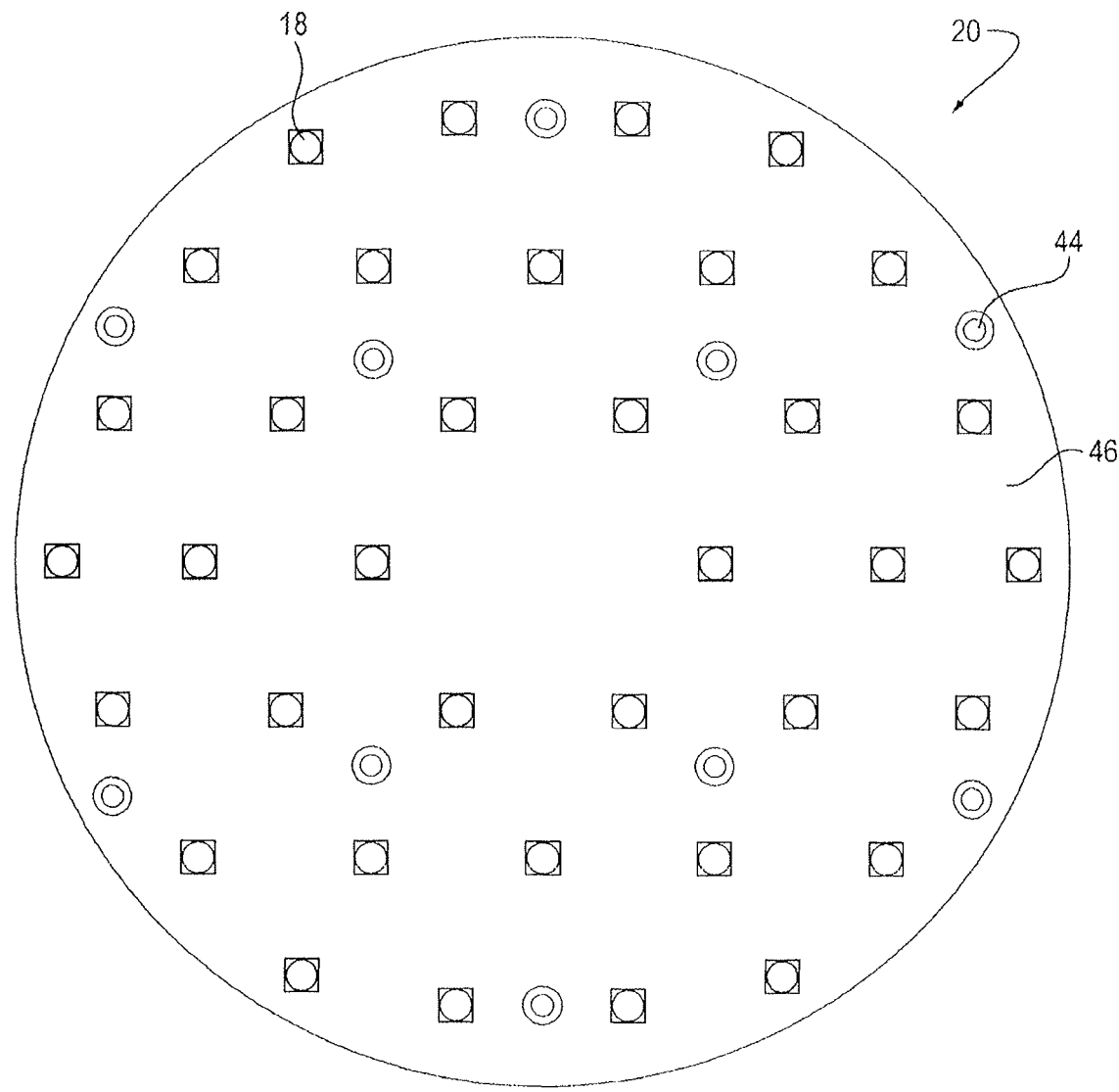
FIG. 5 is a plan view of a LED array for use in the first embodiment.
Figure 6:
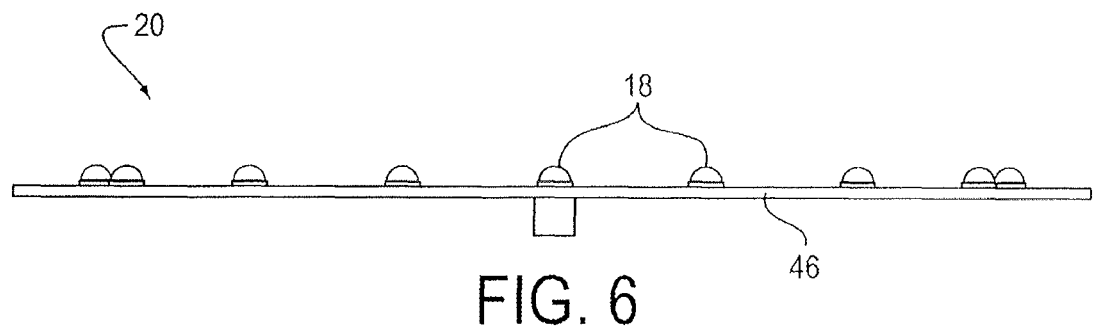
FIG. 6 is a side view of the LED array shown in FIG. 5.

(FIGS. 4-6). In some embodiments, the outer edges 19 of lens element 12 (FIGS. 3-4) can be frosted to reduce off-angle glare.

Figure 7:
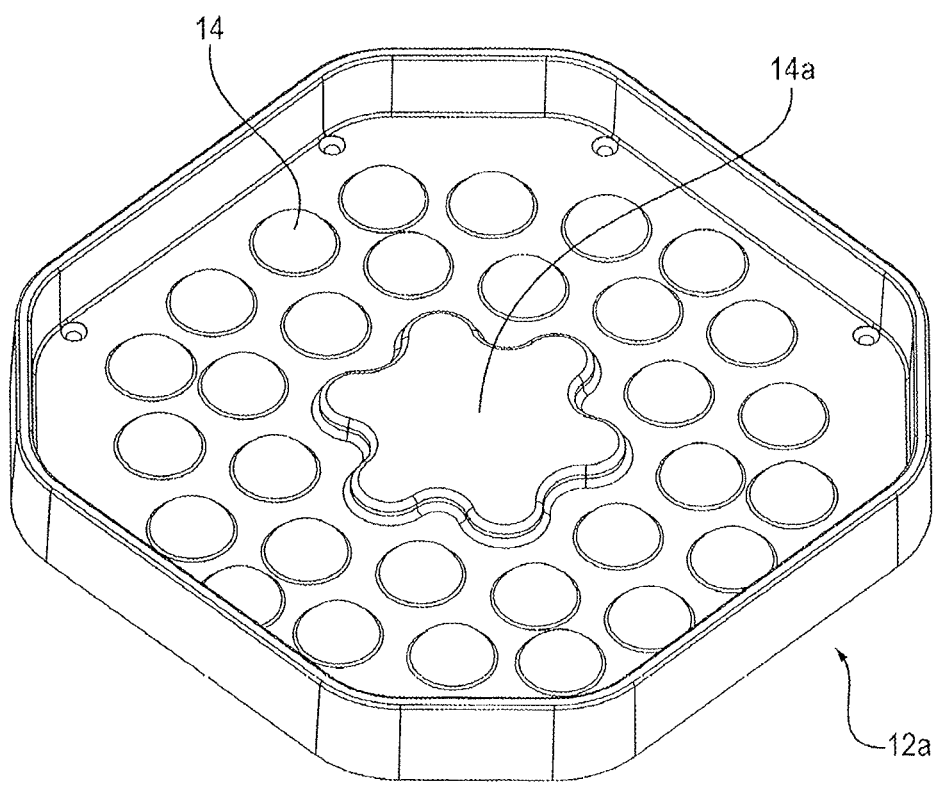
FIG. 7 is a perspective view of an outer frosted dome lens for use in a low bay application of the first embodiment.

FIG. 7 shows a perspective view of a different embodiment of a secondary lens element 12A for use in a low bay application. FIG. 7 contains one or more CCLs 14 integrated into the lens element. Secondary lens element 12A comprises a hexagonal lens 14A that is used to make a more uniform distribution of light on the ground for individual LEDs in LED array 20.

LED Array

Figure 2:
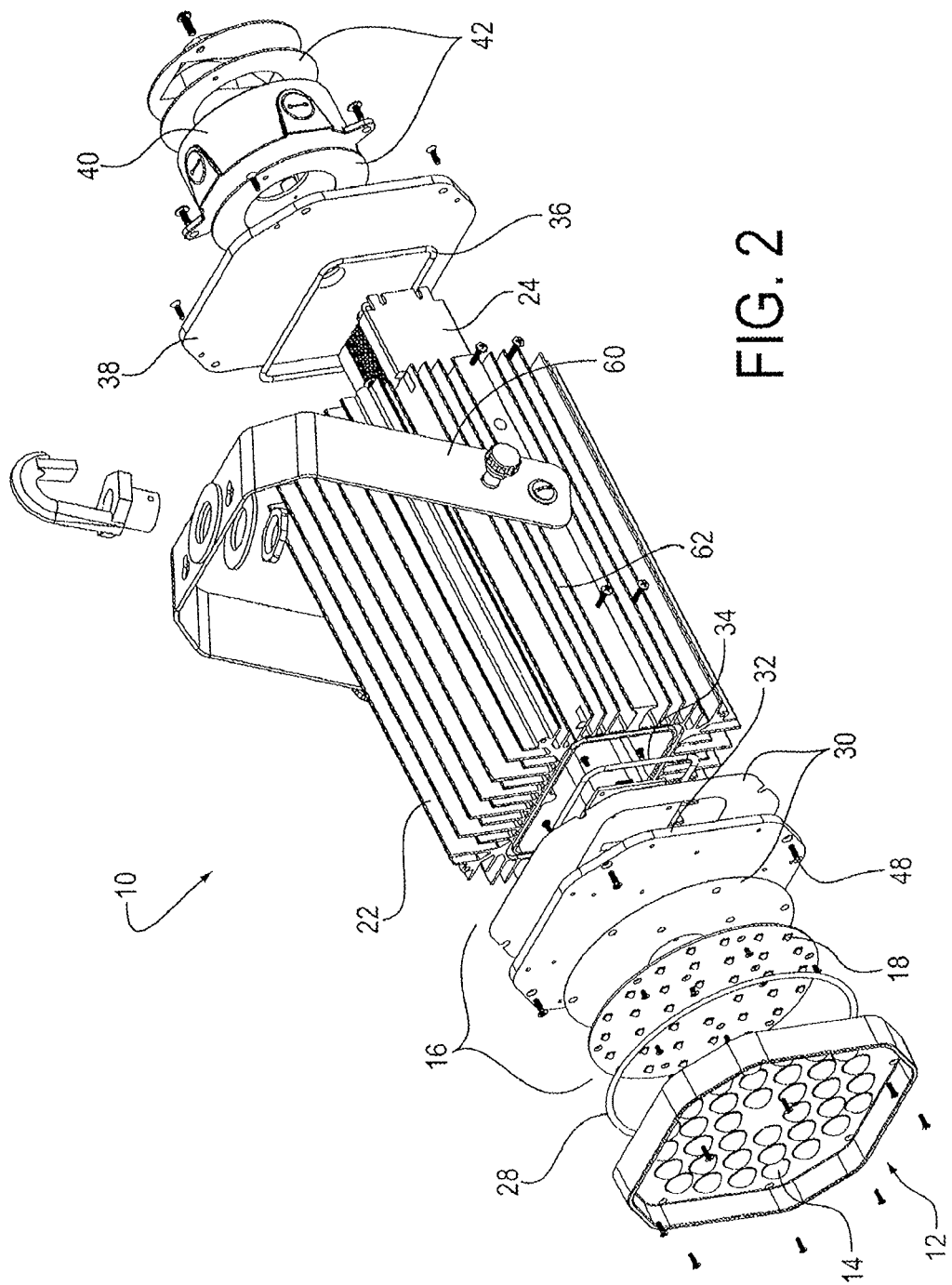
FIG. 2 is an exploded perspective view of the embodiment shown in FIG. 1.
Figure 3:
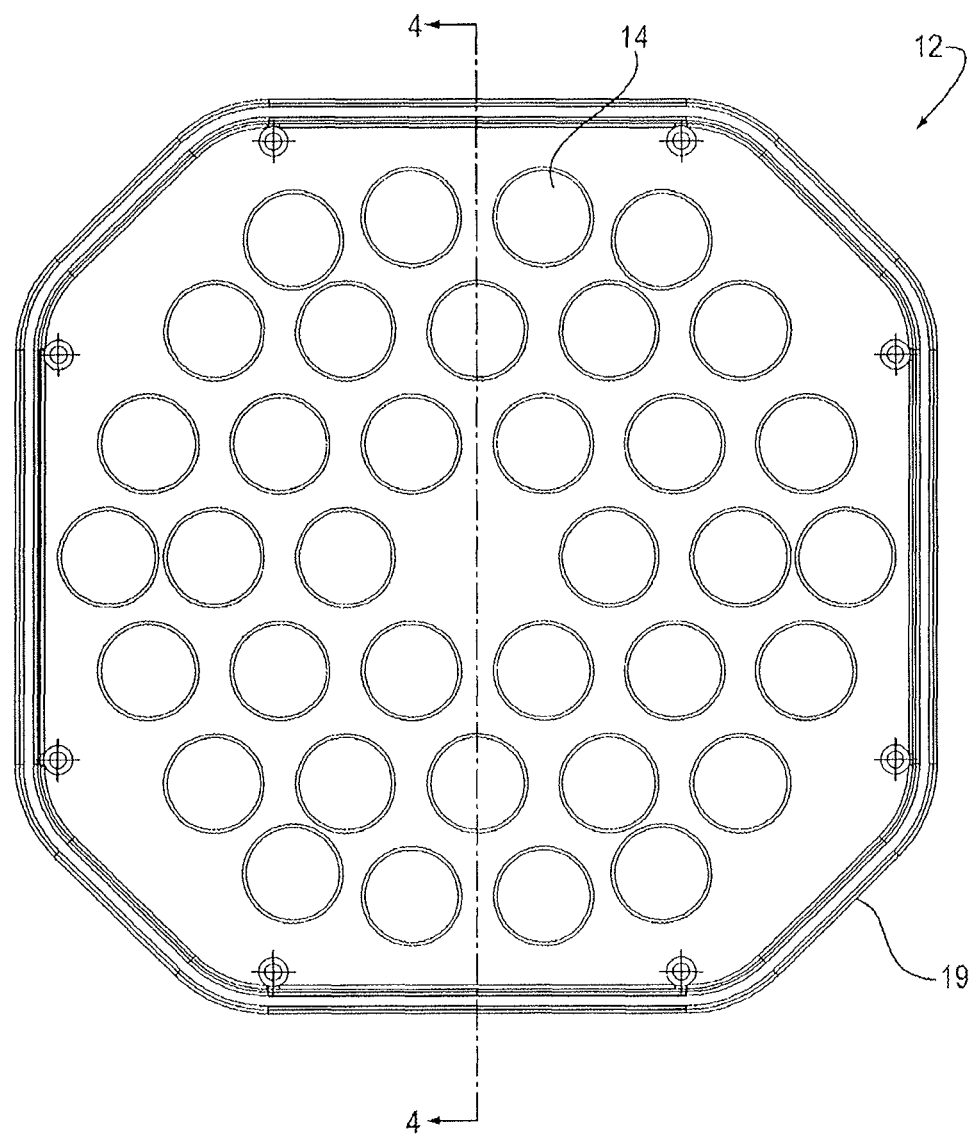
FIG. 3 is a plan view of a lens element comprising a plurality of concavo-convex lenses (CCLs) for use in the first embodiment for flood lighting.

HILL assembly 10 comprises a LED array 20 comprising a plurality of LEDs 18 positioned in the array (see FIGS. 2, 5 and 6). Any suitable LED or plurality of LEDs known in the art can be used in the LED array 20. Each of the LED elements 18 comprises a primary lens.

Figure 8:
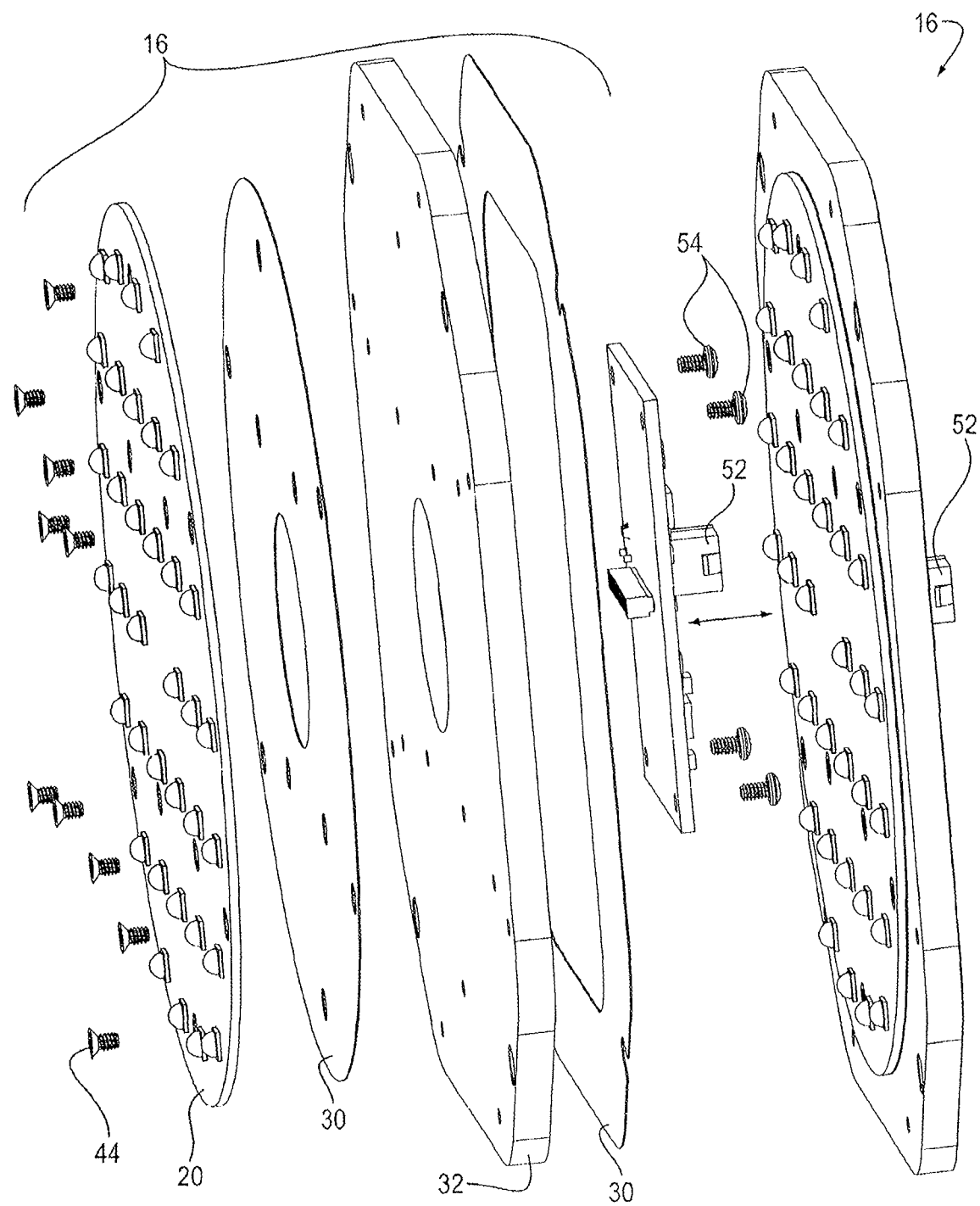
FIG. 8 an exploded perspective view and an assembled view of a LED module (also referred to herein as LED replacement module) in accordance with the present invention comprising a LED array, thermal gaskets, interface plate, a current balancing controller FR4 circuit card, and a power supply connector.

HILL assembly 10 also comprises one or more securing screws 44 (FIGS. 5 and 8) or any other suitable securing fastener, adhesive, clamp, spring pin, or tensioning device that secures the LED array 20 in place. In first embodiment 10, a plurality of screws 44 (a plurality of 10 screws in the embodiment illustrated in FIGS. 5 and 8) are used to secure the various components of the HILL assembly, including the LED array 20, to interface plate 32 (see FIGS. 2 and 8). In a preferred embodiment, the LED array 20 is a component of a LED module 16 ((also referred to herein as a LED "replaceable" or "replacement" module; FIGS. 2 and 8), which can be removed in the field (i.e., where it is installed) through removal of the securing screws 44. This enables the LED module 16 comprising the LED array 20 to be exchanged, interchanged or replaced as desired by the user.

The LED array 20 comprises a circuit board or card 46 (FIG. 5) for controlling the LED array. Preferably, the circuit card 46 is a FR4 circuit board, which is a low-cost fiberglass reinforced epoxy laminate known in the art that is flame retardant. Although metal clad circuit cards known in the art, such as metal core printed circuit boards (MCPCB) can also be used, their use is less preferred, since they have a much greater cost than FR4 circuit boards. In a preferred embodiment, circuit board 46 employs FR4 with thermal via technology to provide a low cost circuit board that performs thermally equivalent or better than a metal clad circuit board. Incorporating thermal vias into board design is well known in the art, and mitigates thermal issues by lowering the thermal resistance of the circuit card itself, (see, e.g., Cree, Inc. (2010), Optimizing PCB Thermal Performance for Cree® XLamp® LEDs, Technical Article CLD-AP37 REV 1, Cree, Inc., 4600 Silicon Drive, Durham, N.C. 27703, available at http://www.cree.com/products/pdf/XLamp_P-CB_Thermal.pdf (last visited Dec. 13, 2011); IPC 7093: Design and Assembly Process Implementation for Bottom Termination SMT Components ISBN 1-580986-90-0, available for purchase at http://www.ipc.org, Table of Contents available free at http://www.ipc.org/TOC/IPC-7093.pdf (last visited Dec. 13, 2011)).

The LED array 20 preferably comprises parallel strings of LEDs 18, which arrangement confers several advantages. First, this allows for graceful degradation as the array ages. For example, in an embodiment with four parallel strings of LEDs, two of the four strings can fail and the light will still provide the rated lumen output. Second, the LED array does not experience hot spots that reduce LED lifespan. By balancing the current through each string to be within 1% of one another, the LED array runs at a uniform temperature. Hot spots form on a LED array when designs use parallel strings without current balancing. As the array powers up, most of the current travels down the string with the lowest voltage potential. Since not all LEDs are created equal, this will happen. When a single string uses more current than the other strings, those LEDs heat up faster than the others. As the string heats up, the LEDs' voltage potential drops, which in turn causes the LEDs to consume more current from the cooler strings. This effect is known in the art as "thermal runaway" and causes LED arrays to fail prematurely.

Figure 9:
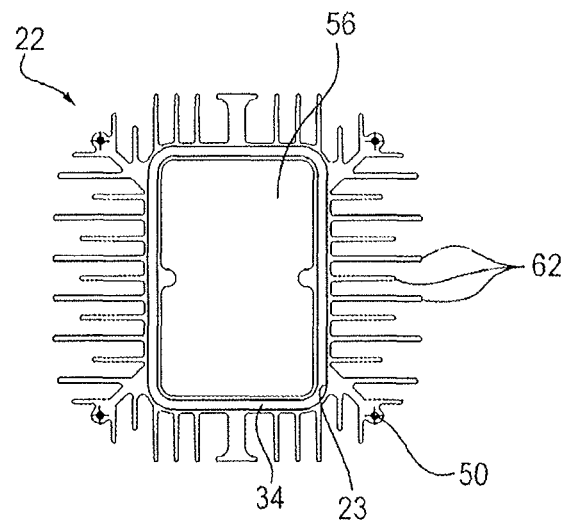
FIGS. 9 and 10 respectively are an end view and a perspective view of a heatsink housing as shown in FIGS. 1 and 2.

In contrast to existing HILL assemblies that have LED arrays either permanently bonded to the heatsink housing 22 or connected through use of a thermal paste, a HILL assembly 10 in accordance with the present invention comprises a LED module 18 comprising a LED array 20 that is a removable and/or exchangeable component and not a permanently installed component of the HILL assembly. The LED array 20 is preferably a component of a LED module 18, but can also be a separate, exchangeable component within the scope of the present invention. Preferably, the LED module 18 comprises pre-installed thermal gaskets or pads 30, so that the end user does not have to apply any thermal paste (which is a tedious, delicate process) when exchanging or replacing the LED module. When installed, the LED module 18 is thermally in contact with heatsink housing 22, which is a high-efficiency finned, thermal radiator, so that heat is dispersed from the module via the heatsink. The LED module 18 is mounted on and removed from the heatsink housing 22 via securing screws 48 (FIG. 2) or other suitable fasteners known in the art, which can, for example, be threadedly received in bores 50 (FIG. 9). The LED module 18 is operably connected electrically through preferably one (preferably keyed) power supply connector (or single connection plug) 52 (FIG. 8) that is attached to interface plate 32 via screws 54 (FIG. 8). In another embodiment, a T-slot connection can be used for operably connecting LED modules.

Heatsink or Heatsink Housing

HILL assembly 10 can comprise a heatsink that also functions as a heatsink housing 22 (FIGS. 2, 9 and 10) that is an open-die, finned metal extrusion formed preferably of an aluminum alloy. It will be recognized by the skilled artisan that other designs known in the art can be used, including but not limited to die castings and split extrusions. The open-die finned extrusion design is preferably used, as it offers a good combination of low price and high performance. Prior art luminaires typically have heatsink bodies that comprise two halves that are bolted or bonded together to form the heatsink. By contrast, the open-die heatsink is one piece, which has numerous benefits (i.e. low cost of assembly, sealing potential, etc.).

Thermal extrusion of the heatsink housing 22 can be used for efficient thermal management. The finned design generates a large surface area over a small length, effectively pulling heat away from the LED components. Additionally, the open cavity 56 of the heatsink housing serves as the housing for internal components, comprising at least one power supply 24. In various embodiments, the open cavity 56 can house a plurality of power supplies.

Heatsink housing 22 comprises a groove 23 (FIG. 9) surrounding the openings of cavity 56 at each end of the housing. An O-ring 34, 36 (e.g., an elastomeric O-ring) is disposed in each groove 23 for sealing cavity 56 by engaging interface plate 32 and back plate 38, respectively (FIG. 2).

Figure 10:
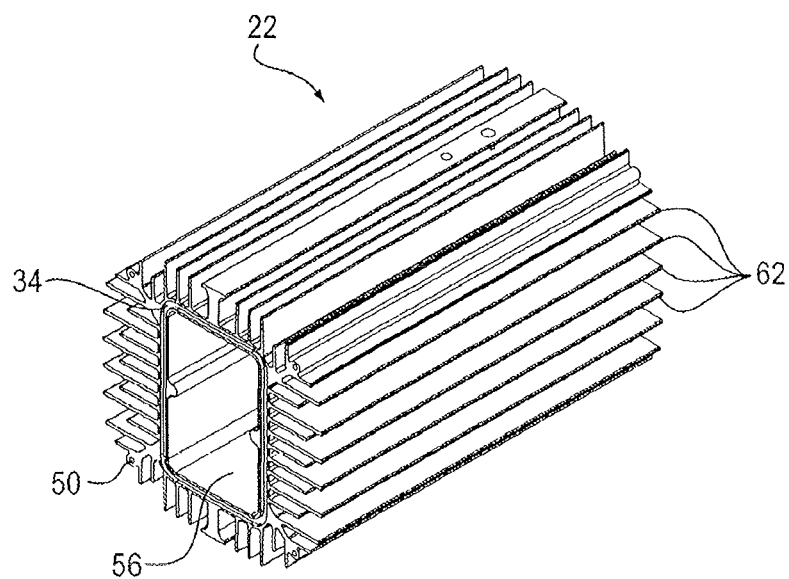

Heatsink housing 22 can also comprise fins 62 (FIGS. 2, 9 and 10). In certain embodiments, the fins 62 are capable of multi-angle positioning. In another embodiment, the fins can be longitudinal. In other embodiments, the fins can be arranged transversely or radially.

In certain embodiments, the heatsink housing is waterproof and/or submersible.

In another embodiment, the mounting bracket 60 is capable of multi-angle positioning.

Components for Positioning and Reducing Off-Angle Glare

Prior art luminaires reduce off-angle glare through the addition of a spun metal or refractive plastic shield, which is an additional cost. These shields are relatively large and totally block off-angle glare but do not block the dispersion of the light source, thus wasting off-angle light output of the device.

The secondary lens 12 of the first embodiment of the HILL assembly 10 can comprise a frosted lip 19 (FIG. 4) that can be integral to the secondary lens element 12 that serves to partially attenuate the light source as seen from an angle. The cost of integrating this frosted lip 19 into the secondary lens is negligible and can be done, for example, as part of the injection molding process for forming lens element 12.

In another embodiment, the HILL assembly can comprise a mounting bracket 60 (FIG. 2) or any other mounting system known in the art for mounting or securing a luminaire or other lighting element. Other suitable mounting brackets for luminaires are well known in the art. In specific embodiments, the mounting bracket or system can swivel, pivot or provide multi-positioning of the HILL assembly.

Figure 11:
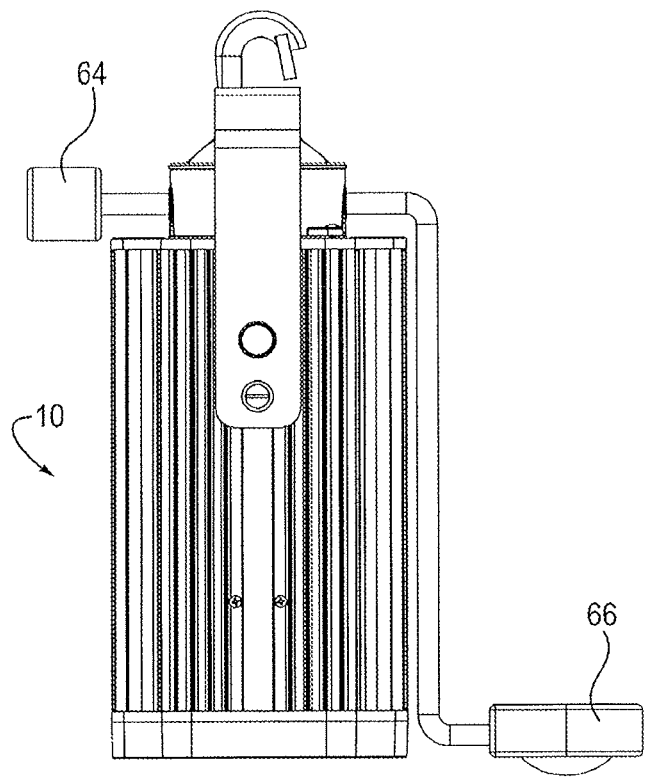
FIG. 11 is a side view of the HILL assembly shown in FIGS. 1 and 2 further comprising an ambient light sensor and an occupancy sensor.
Figure 12:
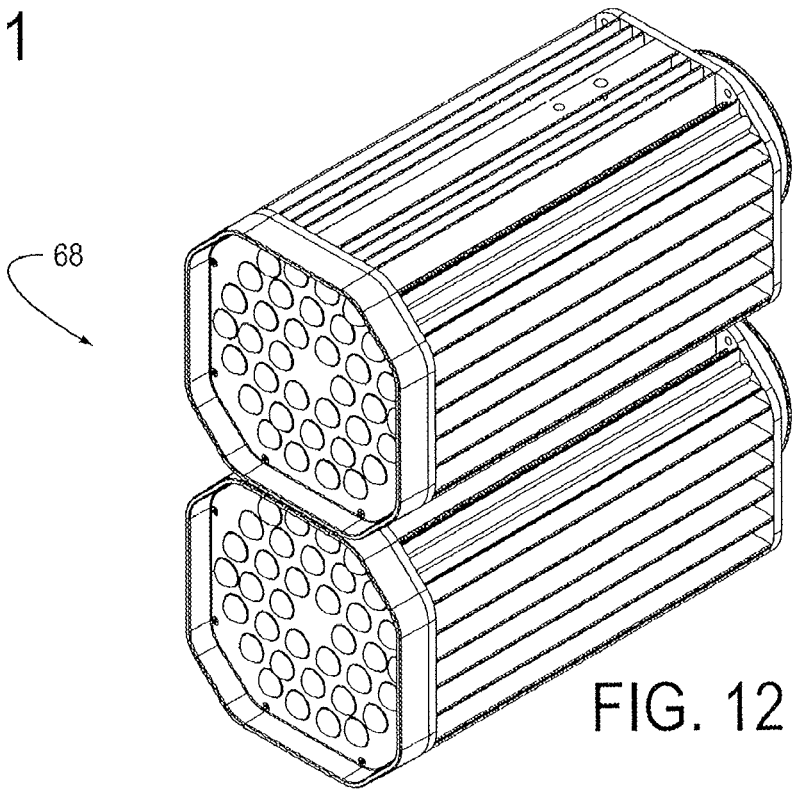
FIGS. 12 through 14 are perspective views showing various mounting configurations that can be achieved with the first HILL assembly embodiment shown in FIG. 1.

As a single fixture, HILL assembly 10 supports free hanging, ceiling, wall, stanchion, and pendant mounting and can optionally comprise a sensor for sensing an environmental parameter of interest, such as an ambient light sensor 64 and/or an occupancy sensor 66 (FIG. 11). Such sensors are well known in the art and commercially available. As will be apparent to the skilled practitioner, such optional components can be installed in a number of suitable configurations for sensing an environmental parameter of interest.

For example, in one embodiment, the ambient light sensor 64 has the ability to generate a user-defined light output profile, as described further below, based on user defined schedules or personnel detection and ambient light measuring. Light output is adjusted based on currently available light, to save the user energy by not duplicating light.

In another embodiment, the occupancy sensor 66 turns the light on/off based on user-defined time intervals.

Figure 13:
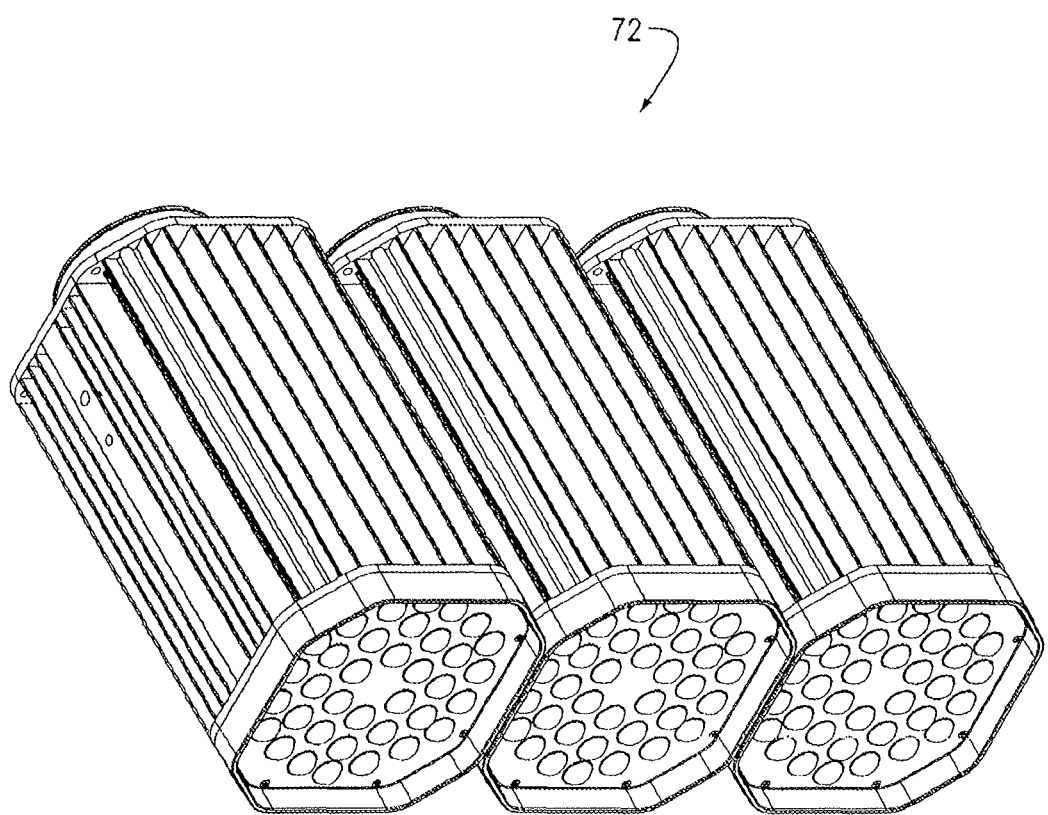
Figure 14:
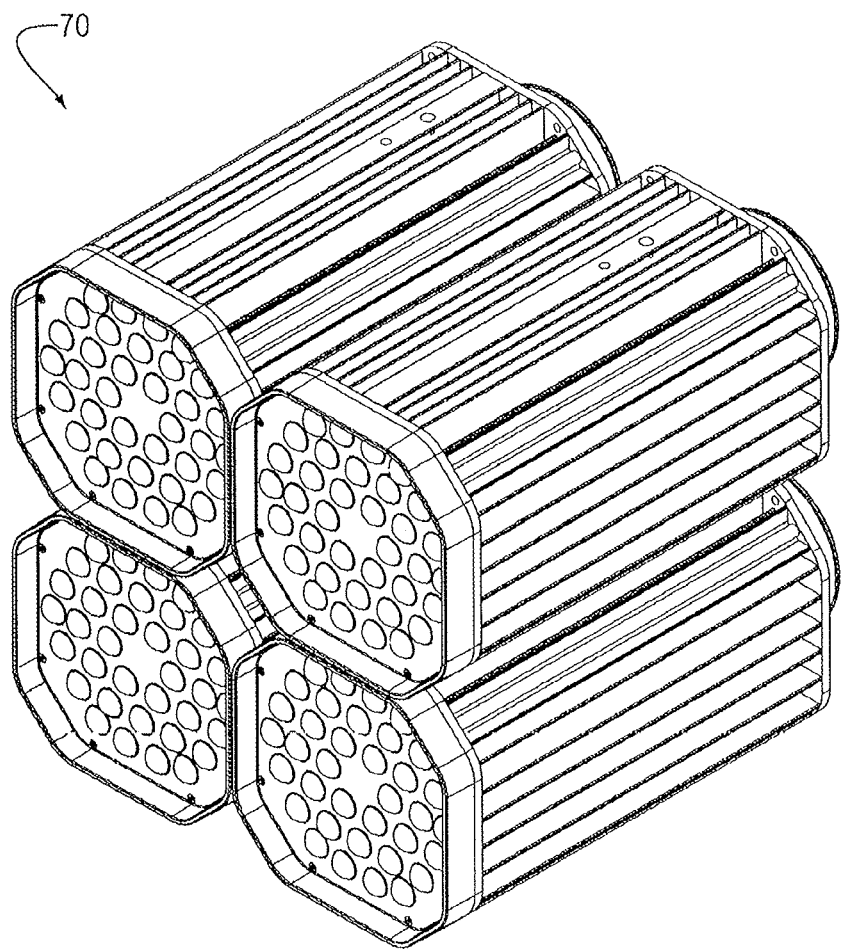

Because HILL assembly 10 has a brick-like design that supports multi-module ganging or stacking, a single HILL assembly 10 can be ganged with other like fixtures to make, e.g., a spot light 68 (FIG. 12), arena/stadium light 70 (FIG. 14), or a linear fixture for wider angle lighting 72 (FIG. 13).

By employing a modular design for HILL assembly 10 and using industry standard open interfaces, the design is flexible and upgradeable.

Because HILL assembly 10 has instant on/off capabilities, it can be used in power management schemes to generate user-defined light output profiles based on user-defined schedules or personnel detection and ambient light measuring. HILL assembly 10 can be used to generate light output based on detection of currently available light (e.g., with optional ambient light sensor 66) and to save the user energy by not duplicating light. In addition, in embodiments in which an occupancy sensor installed, HILL assembly 10 can detect, and be used in, power management schemes that switch the light on or off based on user-defined time intervals.

In one embodiment, HILL assembly 10 can predict or indicate how much time is left on the light until the lumen output decays below the L70 level (70% of lumen output at time=0 hours).

In another embodiment, HILL assembly 10 can comprise a programmable timer or timing function. Such programmable timers or timing functions are well known in the art.

Table 1 presents ranges of dimensions for various elements of HILL assembly 10, as well as the dimensions of one preferred embodiment. It will be apparent to the skilled artisan that other suitable dimensions can be easily determined for the components of the HILL listed below, as well as for other components described herein.

TABLE 1

| Part | Length (in) | | | Width (in) | | | Height (in) | | |
| --- | --- | --- | --- | --- | --- | --- | --- | --- | --- |
| | Preferred | Max | Min | Preferred | Max | Min | Preferred | Max | Min |
| Secondary Lens 12 | 7 | 24 | 0.5 | 7 | 24 | 0.5 | 0.88 | 6 | 0.1 |
| LED Array 20 | 6.15 | 24 | 0.25 | 6.15 | 48 | 0.25 | 0.06 | 0.25 | 0.01 |
| LED Module 16 | 7 | 24 | 0.25 | 7 | 48 | 0.25 | 0.95 | 6 | 0.1 |
| Heatsink 22 | 7 | 14 | 0.5 | 7 | 14 | 0.5 | 11 | 24 | 0.1 |
| Mounting Bracket 60 | 8.17 | 48 | 0 | 7.45 | 48 | 0 | 2 | 6 | 0 |

5.2. High Intensity LED Luminaire (HILL) Assembly—Second Embodiment

A HILL assembly is also provided that is based on a modular design. In various embodiments, the HILL assembly can comprise modular lensing provided by, e.g., a lens matrix, a plurality of LED modules or modular LED arrays, joiner brackets that allow for modularity and custom angular positioning of light output, modular heatsink housing(s) and high power modular circuits (that can operate, for example, at high temperatures).

The modular lensing allows for mixing and matching of distribution patterns, which can provide precise, including but not limited to custom, optical controls.

The LED modules or modular LED arrays can have a shared cover design that allows for stacking or joining of multiple modules without the need for fasteners. An advantage of this design is that it does not interfere with the function of the heatsink. The design can allow heat to be pulled with convectional heat transfer.

The cover can also allow for modules to be attached by a joiner bracket as separate units with the cover holding them together. In a specific embodiment, a power supply can be positioned in the middle of such a modular arrangement.

Figure 15:
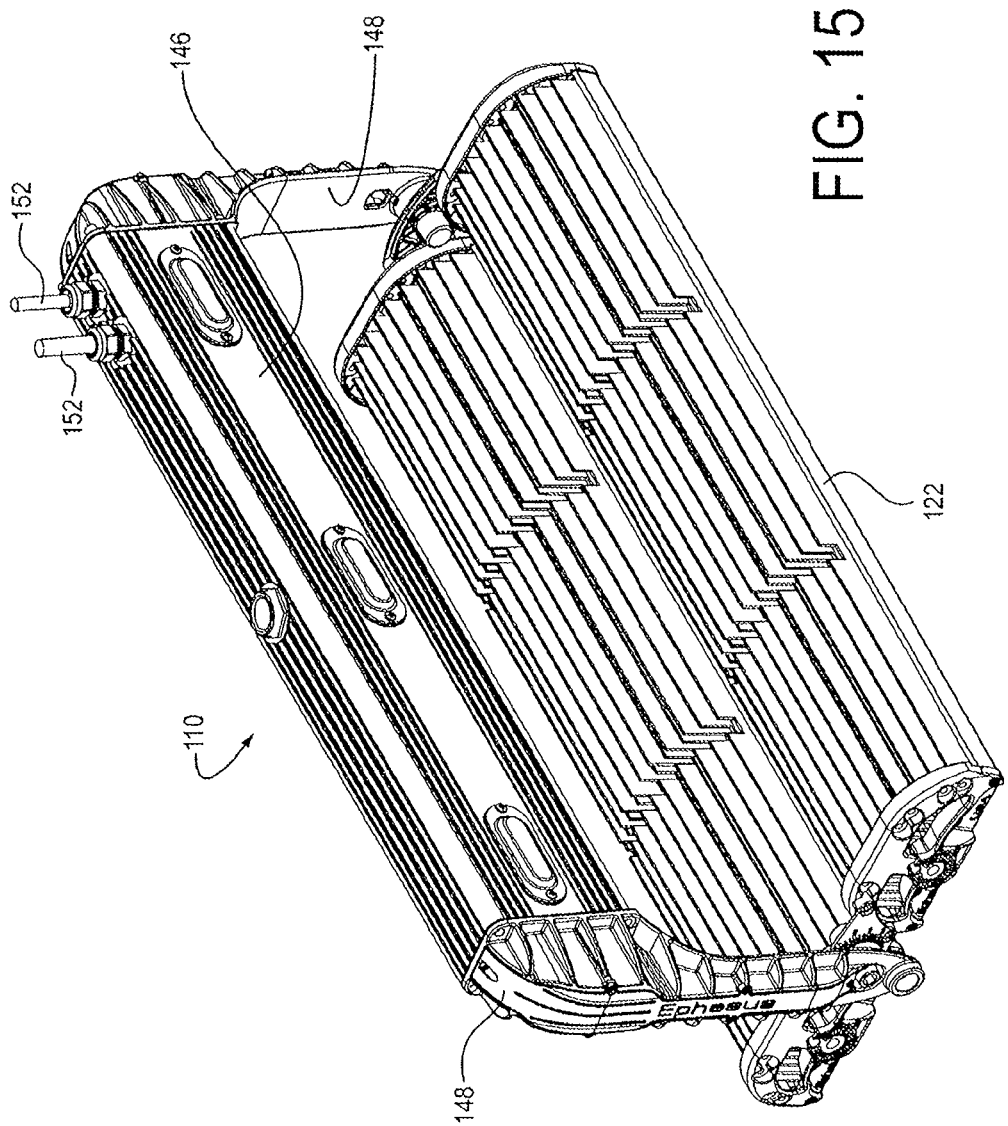
FIGS. 15 and 16 are perspective views from above and below, respectively, of a second embodiment of a HILL assembly in accordance with the present invention.
Figure 16:
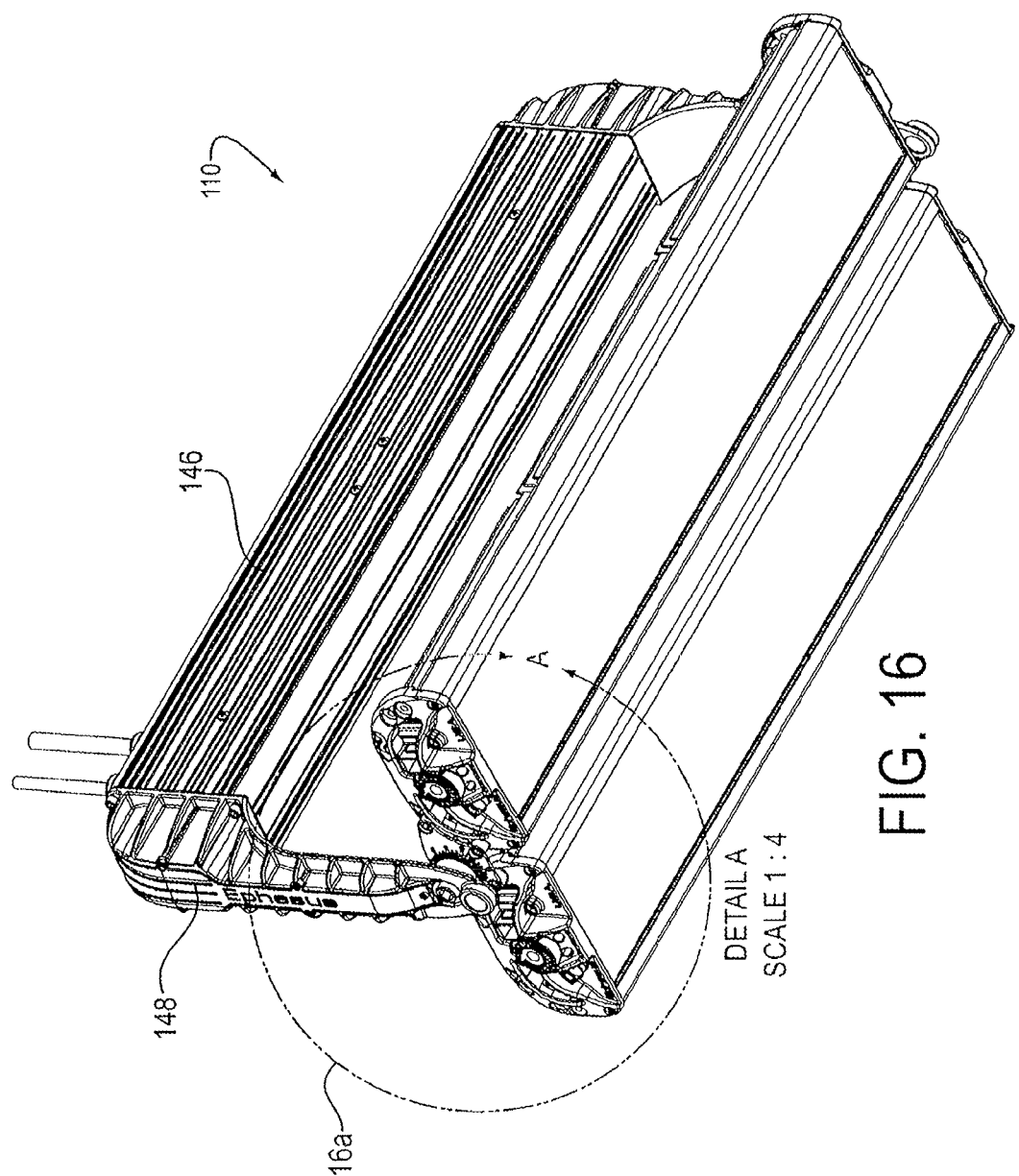
Figure 16A:
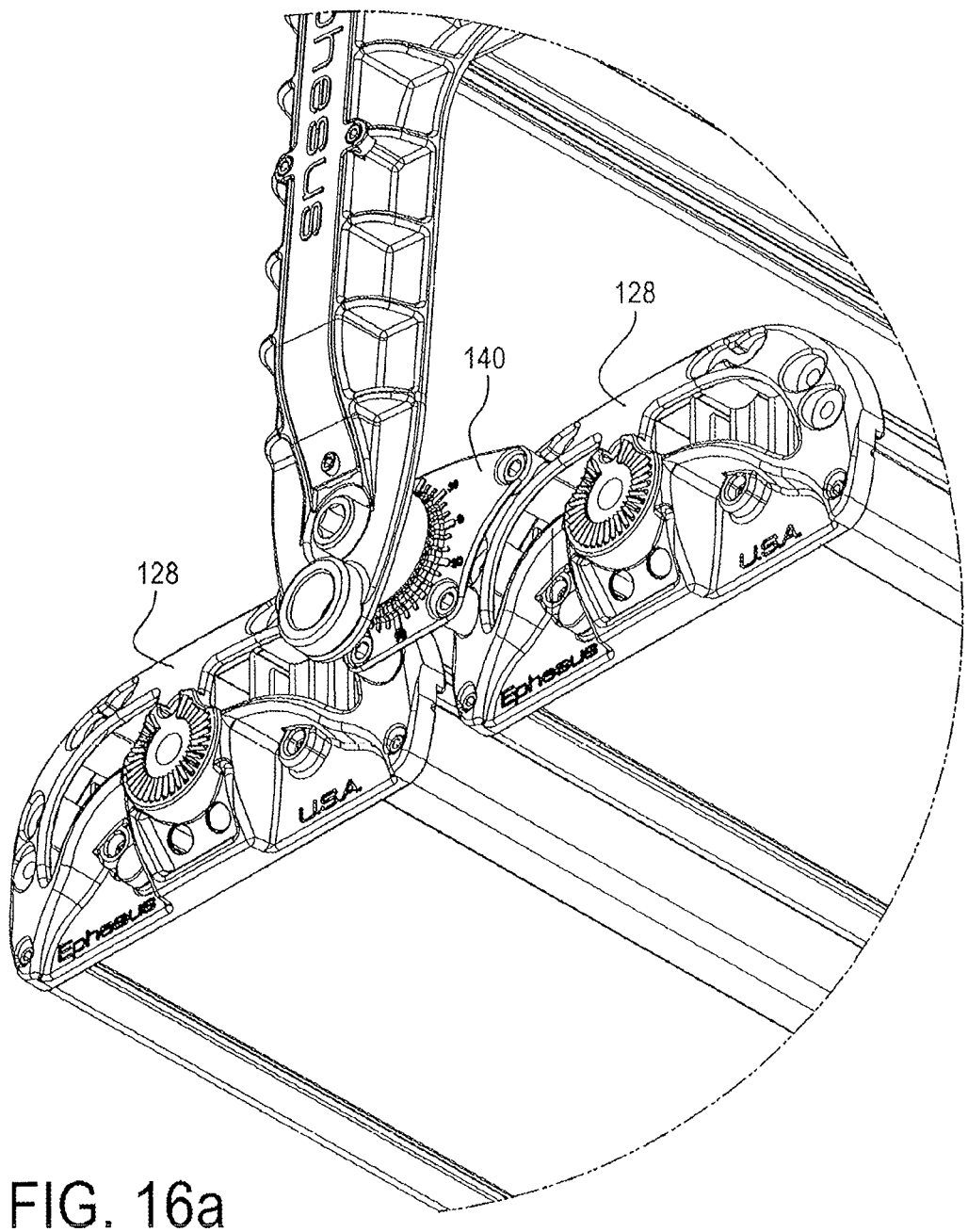
FIG. 16a is an enlarged view of the portion of FIG. 16 shown in circle 16a showing the joiner with mating edges.

Referring now to FIGS. 15-31, a second embodiment 110 of a HILL assembly in accordance with the present invention is shown. FIGS. 15 and 16 are perspective views from above and below, respectively, of this second embodiment.

HILL assembly 110 comprises a linear, one-piece, finned, metal heatsink housing 122 formed preferably by extrusion of an aluminum alloy (see FIGS. 18-21). Heatsink housing 122 forms the structural frame of assembly 110 and comprises several features that permit attachment of essentially all the other components of assembly 110, as described below.

The HILL assembly can be thermally optimized for heat transfer through gable and ridge vent thermal optimization.

Figure 19:
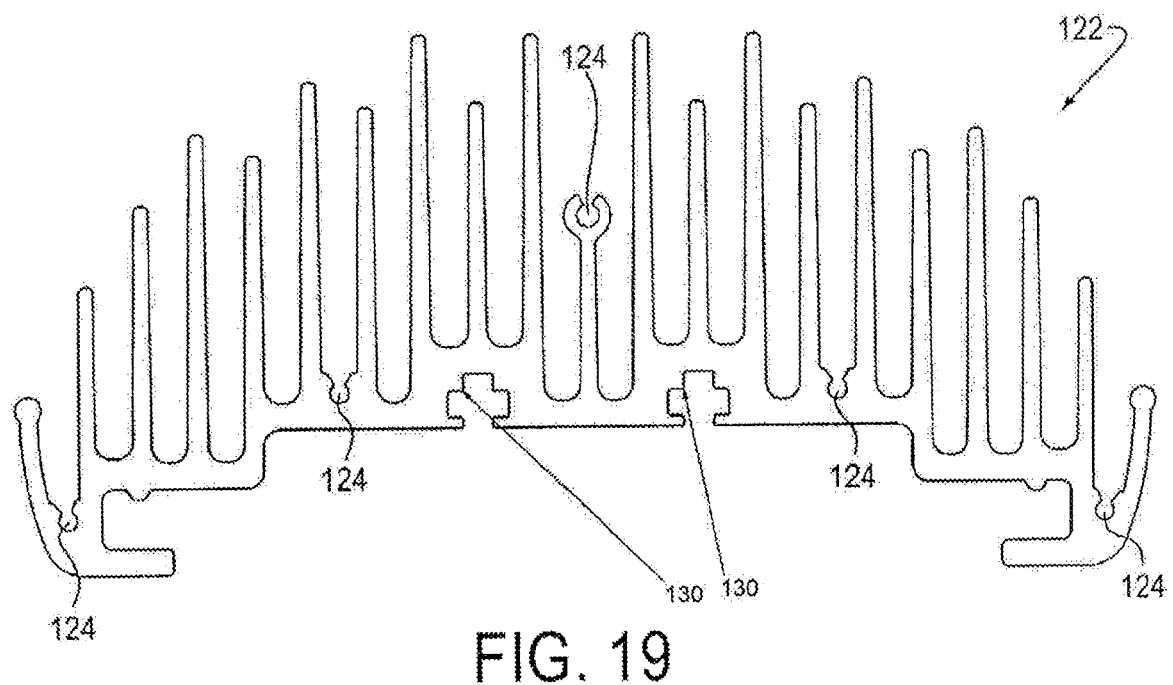
FIG. 19 is an end view of a finned heatsink.
Figure 20:
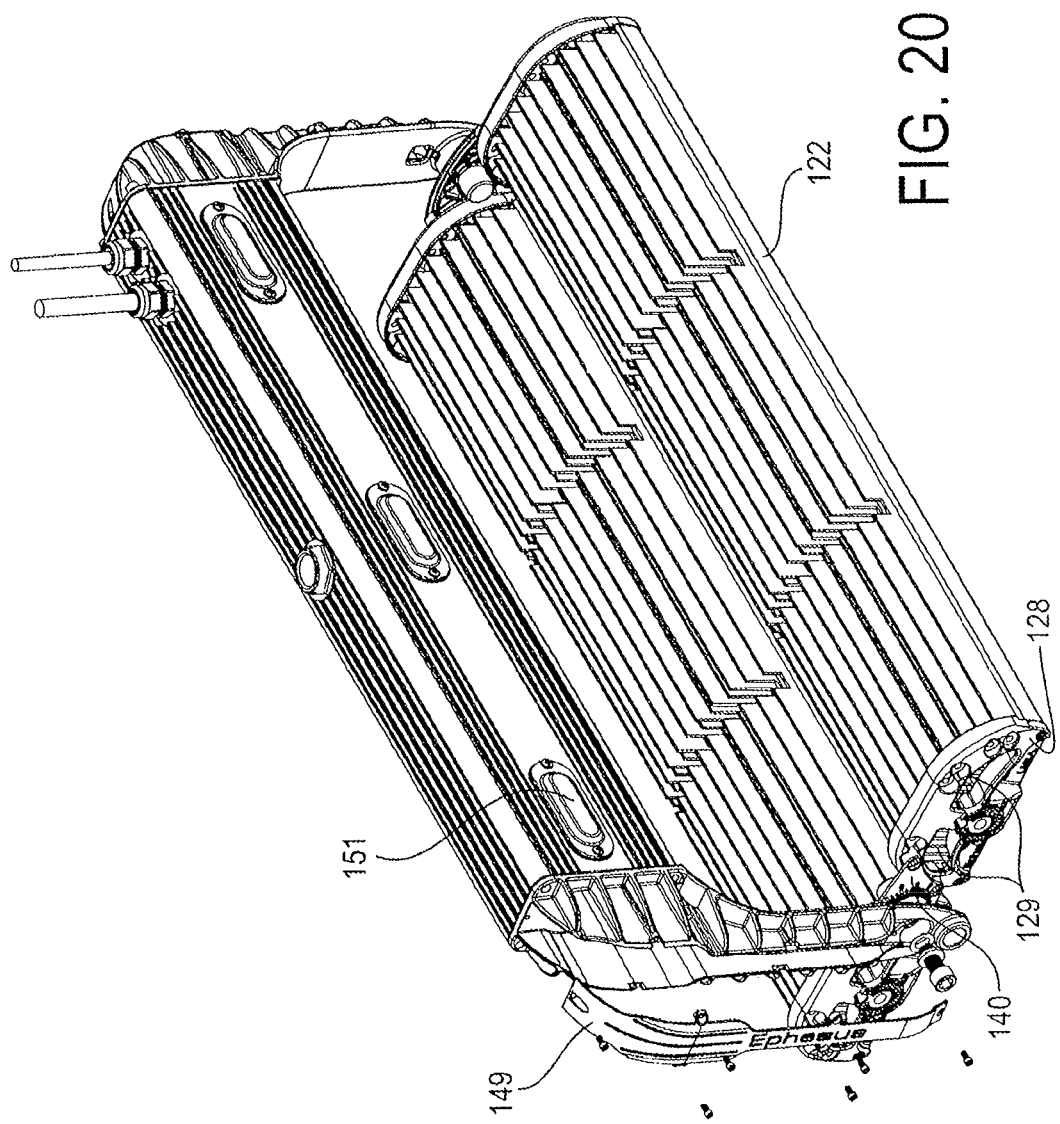
FIG. 20 is a first exploded perspective view from above of the second embodiment shown in FIG. 15.

A plurality of formed channels 124 receive a plurality of screws 126 that secure end cap 128 (also referred to herein as gable end cap) to heatsink 122, as shown in FIGS. 19 and 20. End cap 128 preferably includes at least one opening 129 (FIG. 20) as an intake for convectional cooling air for the fins in heatsink 122. The aspect ratio of the end cap 128 allows for a vortex to drive heat from the finned region of heatsink housing 122 and allows for driving the LEDS at higher currents than in the prior art to yield higher light output, as described in more detail below. The heatsink housing 122 can have, for example, two slits cut to increase airflow, therefore reducing the temperature of the HILL assembly.

Figure 18:
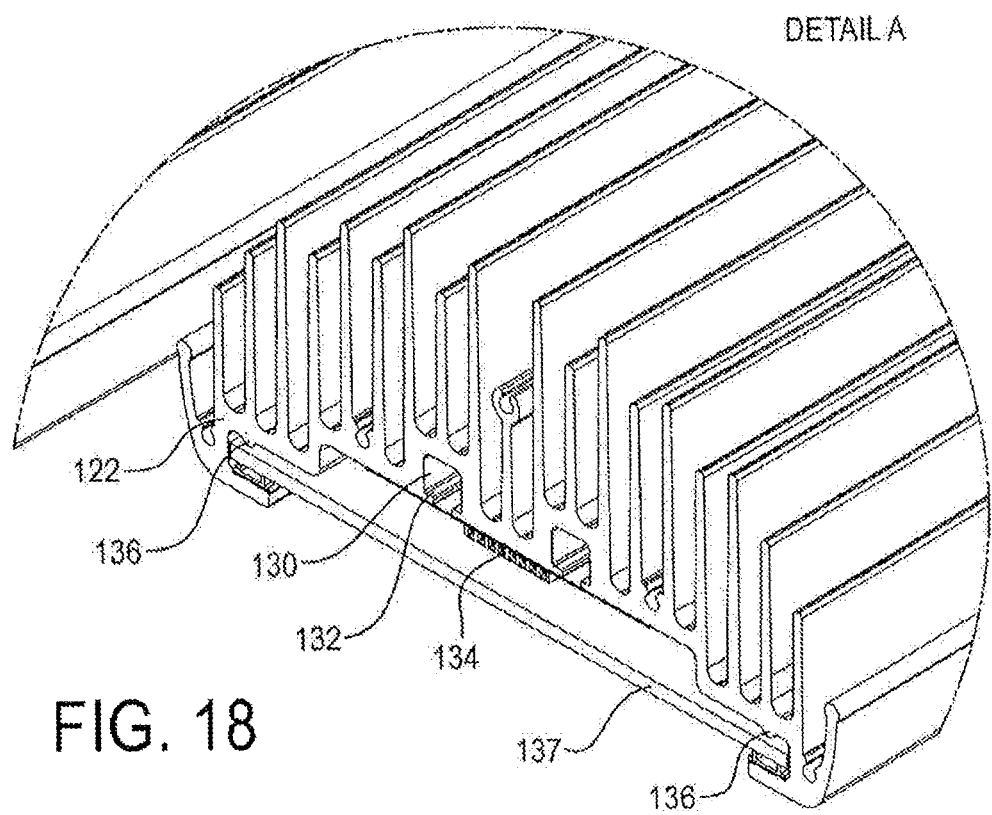
FIG. 18 is an enlarged view of the portion of FIG. 17 shown in circle 18.
Figure 21:
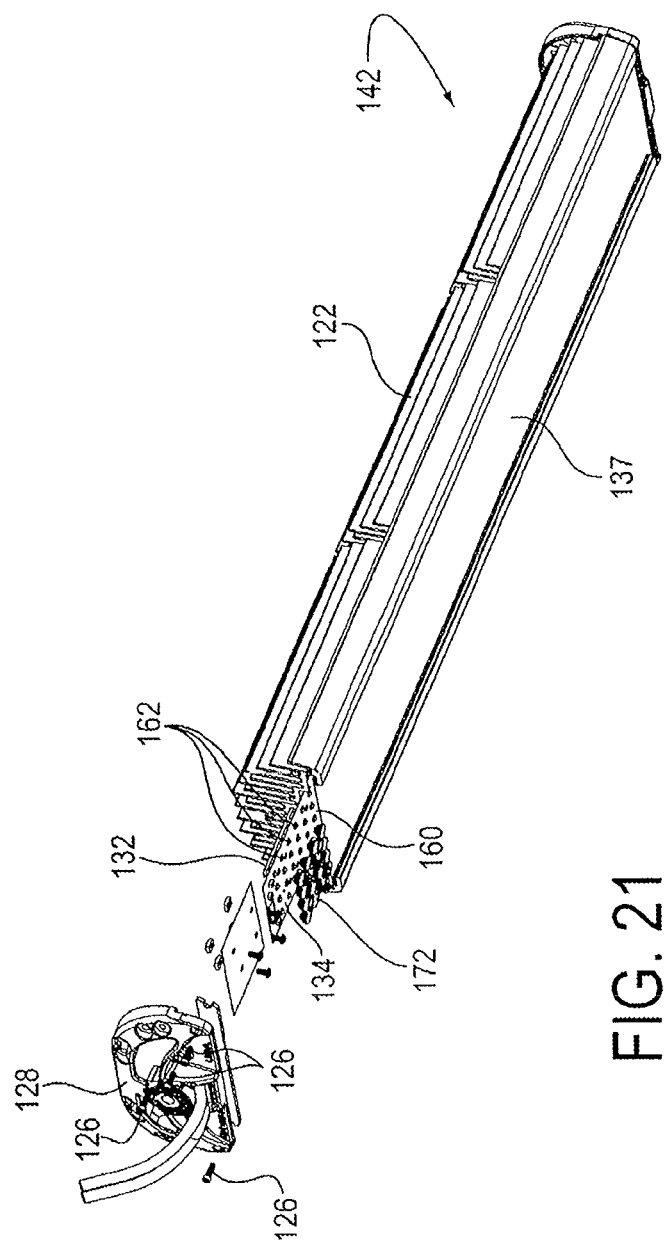
FIG. 21 is a second exploded perspective view from below of the second embodiment shown in FIG. 15.
Figure 26:
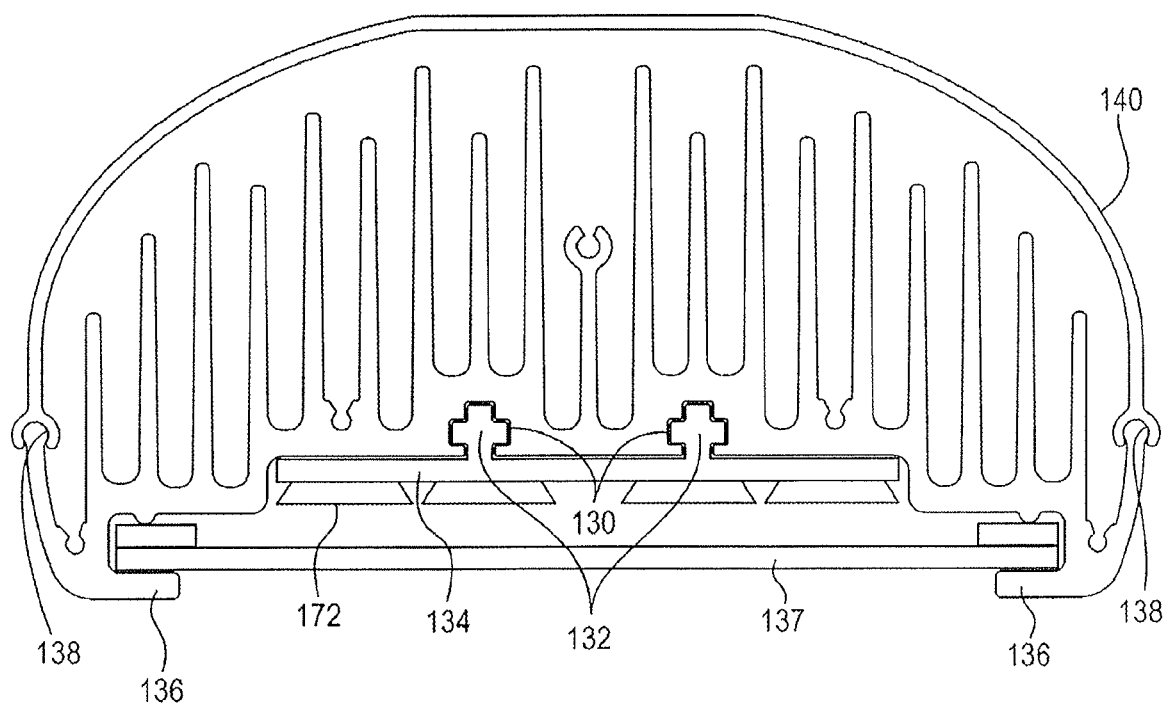
FIG. 26 is an end view of an exemplary single-module HILL in accordance with the second embodiment shown in FIG. 21.

A plurality of mating features, e.g., T-slots 130 can receive mating features (e.g., T-mating features) 132 extending from LED module (also referred to herein as LED subassembly) 134, as shown in FIGS. 18, 21, and 26, providing secure mounting and thermal connection of LED module 134 to heatsink housing 122. The use of T-slots increases the efficiency of the HILL assembly, and allows, for example, for mixing LED arrays together on a common track.

Opposed lips 136 receive opposed edges of a sealing lens 137, protectively enclosing LED module 134, and in certain embodiments, rendering it waterproof. In one embodiment, the sealing lens can be made of a transparent thermoplastic such as poly(methyl methacrylate) (PMMA).

A joiner (or "joiner bracket") 140 is also provided. Outer beaded fins 138 can receive mating edges of the joiner 140 in either a single-module HILL assembly, as shown in FIG. 26, or optionally in a multiple-module HILL assembly. In one embodiment, this joiner is configured to allow for angular positioning to direct light output to meet specific needs.

In one embodiment, a HILL assembly module 142 can comprise a heatsink housing 122, a LED module 134, and a sealing lens 137. Such a HILL assembly module 142 may be employed singly or ganged in a wide variety of configurations determined by lighting requirements and space. For example, a single module assembly can form a desk lamp or under-cabinet kitchen lamp; a double module assembly such as is shown in FIGS. 15 and 16, can be useful as an overhead shoplight or for general overhead illumination by ceiling installation; and larger still assemblies, such as 16-module assembly 144 shown in FIG. 25, can be useful for wide area floodlighting as in stadiums or arenas. Referring to FIG. 20, to make the HILL assembly modular, a joiner 140 is used to fasten or connect heatsink housings together.

A bracket arm 148 is connected to either the endcap or the joiner 140 on each side of the HILL assembly. The bracket arms 148 can contain or enclose the wiring for the power supply 150 and connect to each side of the power supply casing 146. A bracket cover 149 can cover the bracket arm. Inside the casing 146, at least one DC power supply 150, and in a specific embodiment, two DC power supplies 150, can be attached. The power supply casing permits cooling of the power supply 150.

Referring now to FIGS. 21 through 24, in a presently-preferred embodiment, each HILL assembly module 142 comprises two LED modules 134 disposed end-to-end (shown for clarity without sealing lens 137). To assemble HILL assembly module 142, the T-features 132 of each LED module are simply entered into the mating T-slots 130 in heatsink housing 122.

The HILL assembly can have on-board "string" control and current sharing, i.e., constant on-time current control. Referring now to FIGS. 24-31*a-c*, each LED module 134 can comprise a circuit board 160 upon which are mounted 64 LEDs 162 arranged in four rows of 16 LEDs each. Preferably, the LEDs 162 in each row are wired in series and the rows 164, also referred to herein as "strings", are wired in parallel. Circuitry 166 provides constant current to the LEDs such that if one LED fails, the circuit auto-adjusts to provide more current to the remaining LEDs, thus restoring total light output. HILL assembly module 142 includes a power supply 150 (FIG. 17) that includes a DC-DC converter that can downstep any incoming voltage from up to 390 v down to 12 v operating voltage. Such a low voltage step-down converter enables high efficiency of the HILL assembly.

Circuitry 166 for driving the LEDs 162 is mounted directly on circuit board 160, allowing the constant current feature just described, and is connected to first and second multi-prong connectors 168*a*, 168*b* at opposite ends of circuit board 160, allowing connection to adjacent modules 134.

Because circuitry 166 is designed specifically for these applications and is not bought off-the-shelf, circuitry 166 can be formed, in one embodiment, as an integral element of circuit board 160. This results in greatly increased electrical efficiency of 100 lumens/watt, whereas prior art systems typically operate in the range of 80 lumens/watt. Because the light output is greater, there is less waste electrical energy and less heat generated, e.g., thermal density is reduced. This permits LEDs 162 to run continuously at only 80° C. or lower, whereas prior art systems being driven at such high light outputs must run at greater than 100° C. and are therefore prone to thermal runaway and failure.

Because circuitry 166 can operate at constant current, the power flowing to the individual LED strings 164 is balanced, preventing thermal runaway. Referring to FIG. 30, LED driver 180 (LM3464) includes a feedback loop that continuously balances power feed to minimize temperature on each LED string 164.

The HILL assembly can have optimized thermal transfer from the LED array to the heatsink housing through a thermally conductive material. In one embodiment, to disperse and equalize the heat generated by LEDs 162, each LED can be positioned on the front side of circuit board 160 adjacent at least one via element (not visible) extending through circuit board 160 into connection with a via backing (not visible) on circuit board 160 formed of a thermally conductive material such as copper, beryllium oxide, aluminum, FR4, or graphene.

Figure 22:
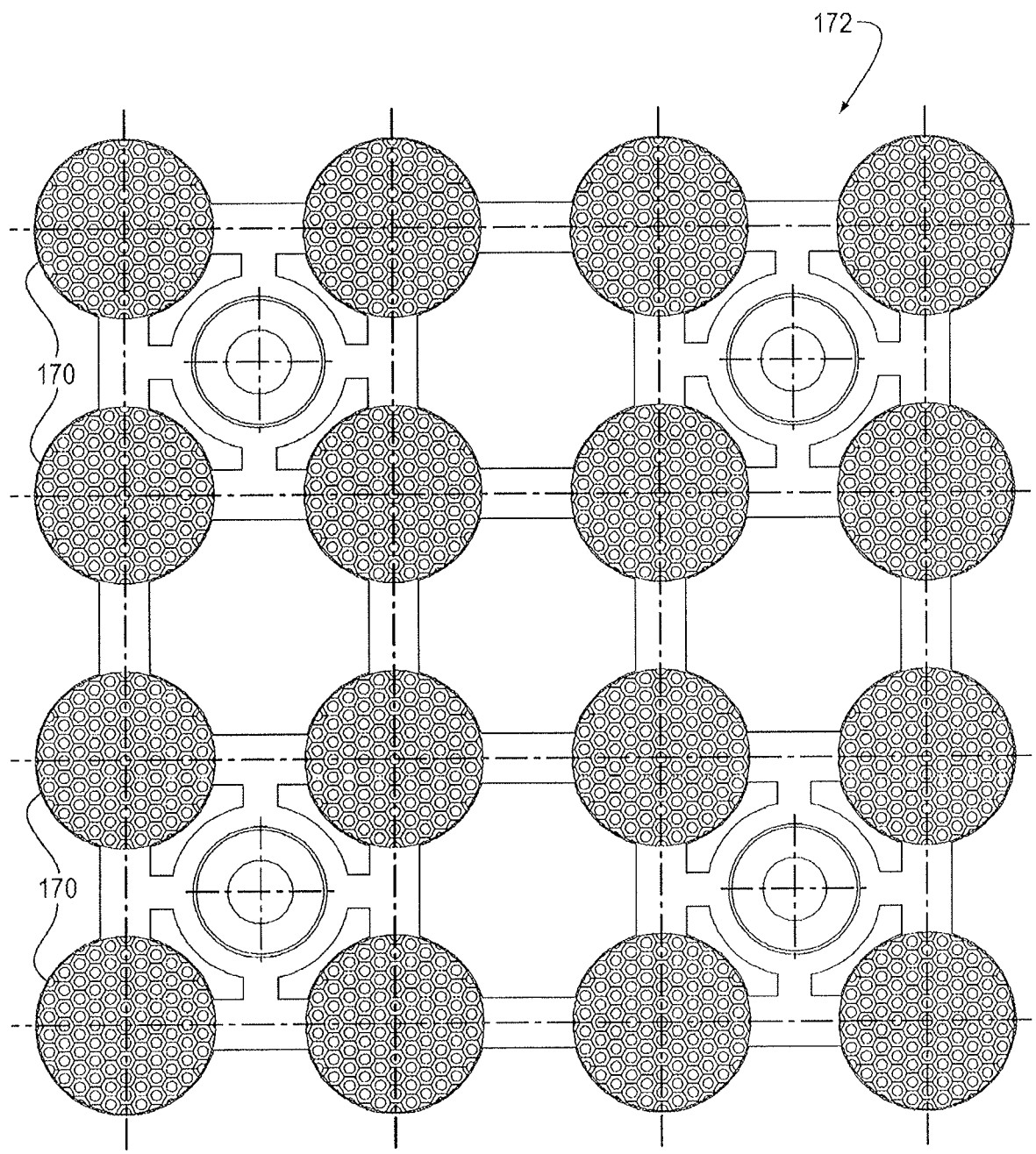
FIG. 22 is a plan view of an idealized 16-lens module in accordance with the present invention.
Figure 23:
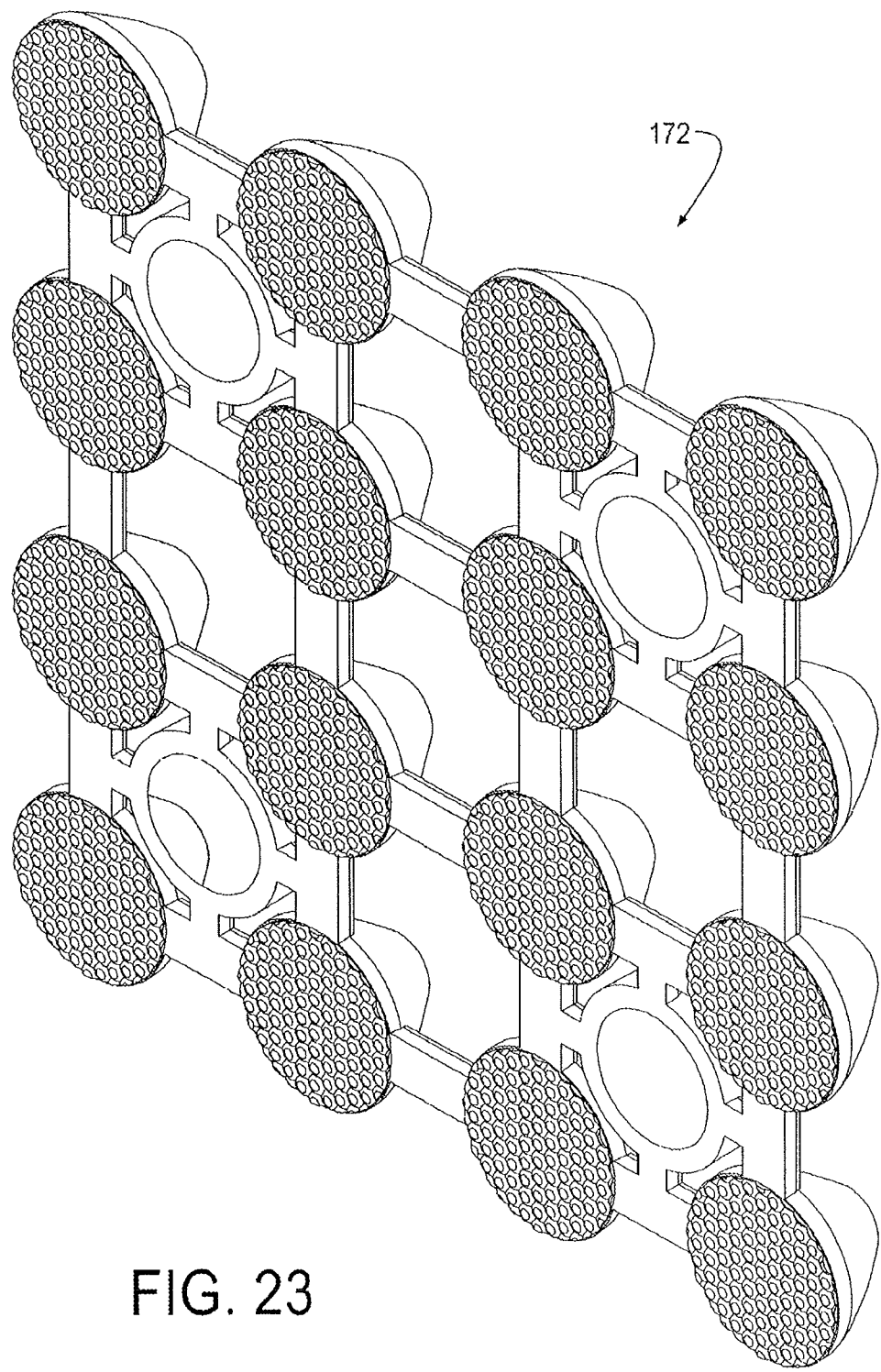
FIG. 23 is a perspective view of the idealized lens module shown in FIG. 22.
Figure 24:
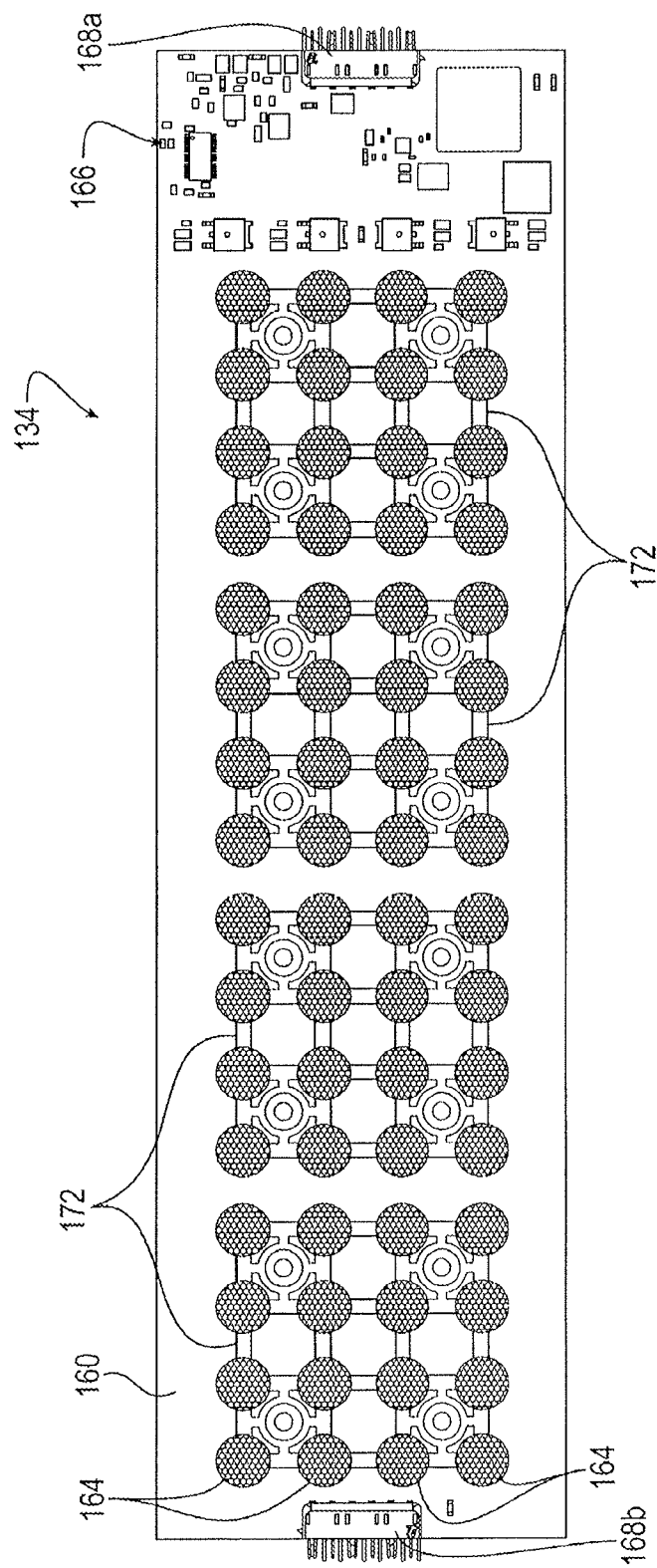
FIG. 24 is a plan view of a modular circuit board assembly in accordance with the present invention.
Figure 25:
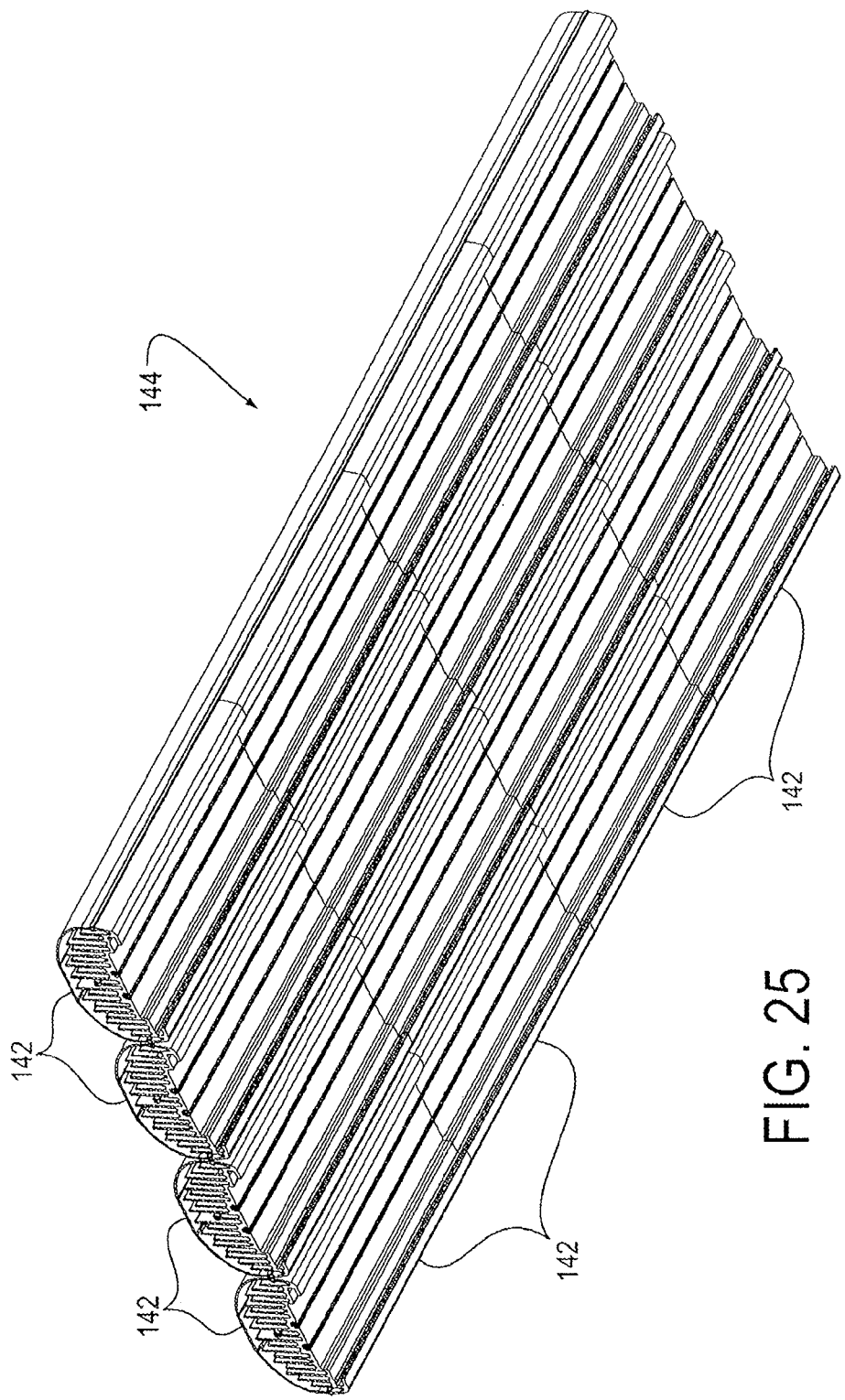
FIG. 25 is an isometric view of an exemplary multiple-module assembly of HILLs in accordance with the second embodiment shown in FIG. 21.

A secondary lens 170, similar to secondary lens 12 in first embodiment 10, is disposed over each LED 162. Lenses 170 preferably are formed in modular lens matrices (also referred to herein as lens subassemblies) 172 of lenses, e.g., a 4×4 array of 16 lenses (although other suitable lens matrices can be determined by the skilled artisan) arranged in a square matrix that can be screwed down on top of its respective LEDs, as shown in FIGS. 22-24.

Figure 27:
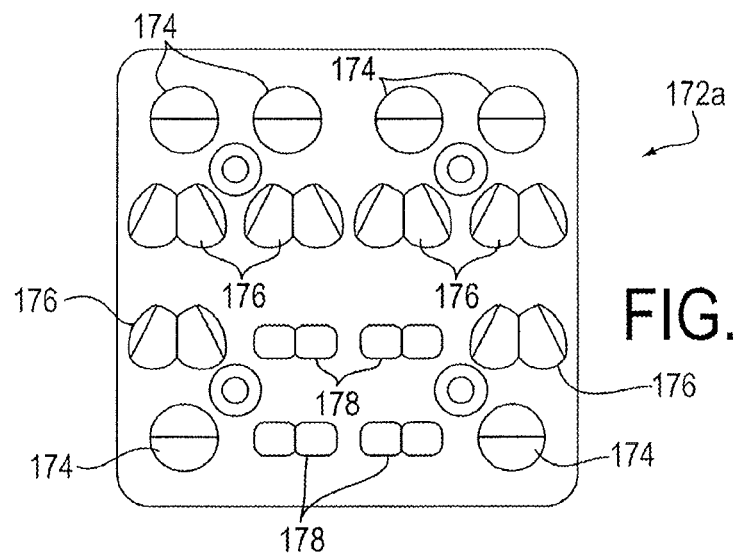
FIG. 27 is a plan view of a first exemplary embodiment of a 16-lens modular subassembly in accordance with the present invention.
Figure 28:
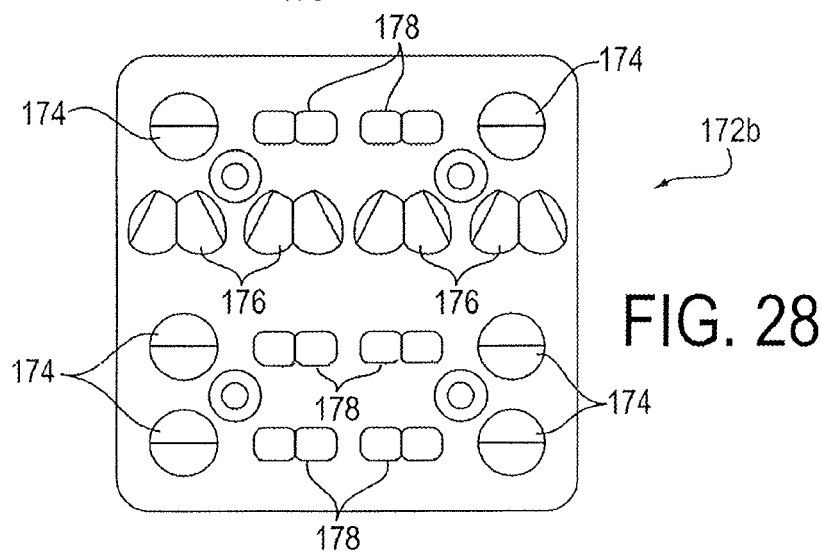
FIG. 28 is a plan view of a second exemplary embodiment of a 16-lens modular subassembly in accordance with the present invention.
Figure 29:
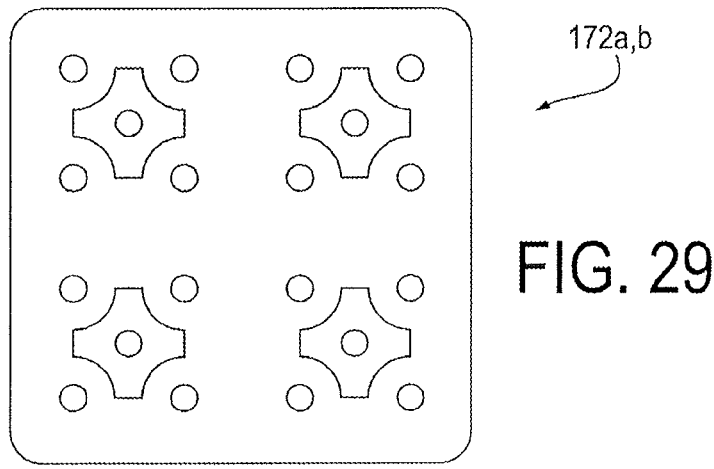
FIG. 29 is a plan view of the reverse side of either of the first and second embodiments shown in FIGS. 27 and 28.
Figure 30A:
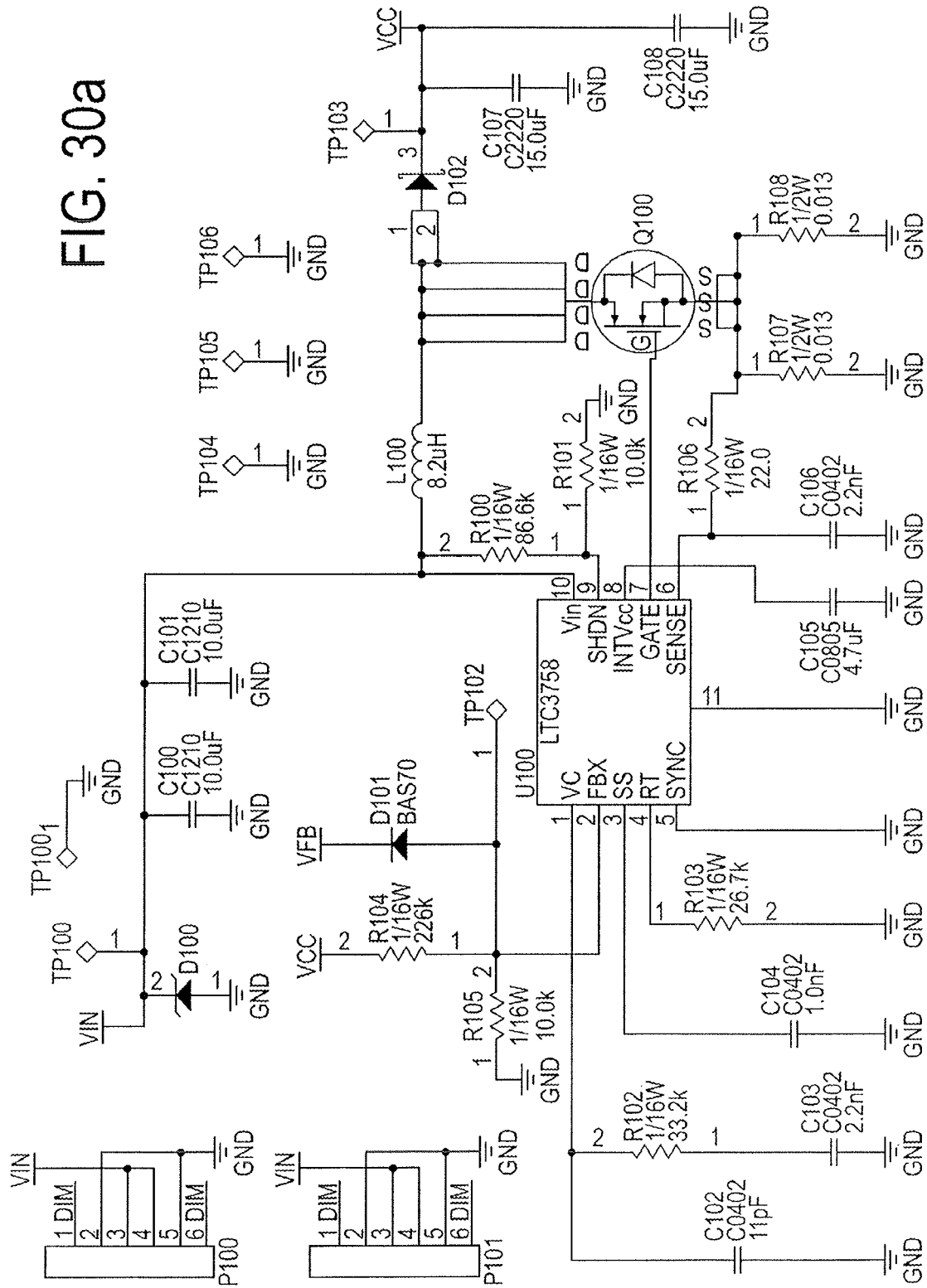
FIGS. 30a, 30b, 30c, 30c(1), and FIG. 31 are electrical drawings of LED driver circuitry in accordance with the present invention.
Figure 30B:
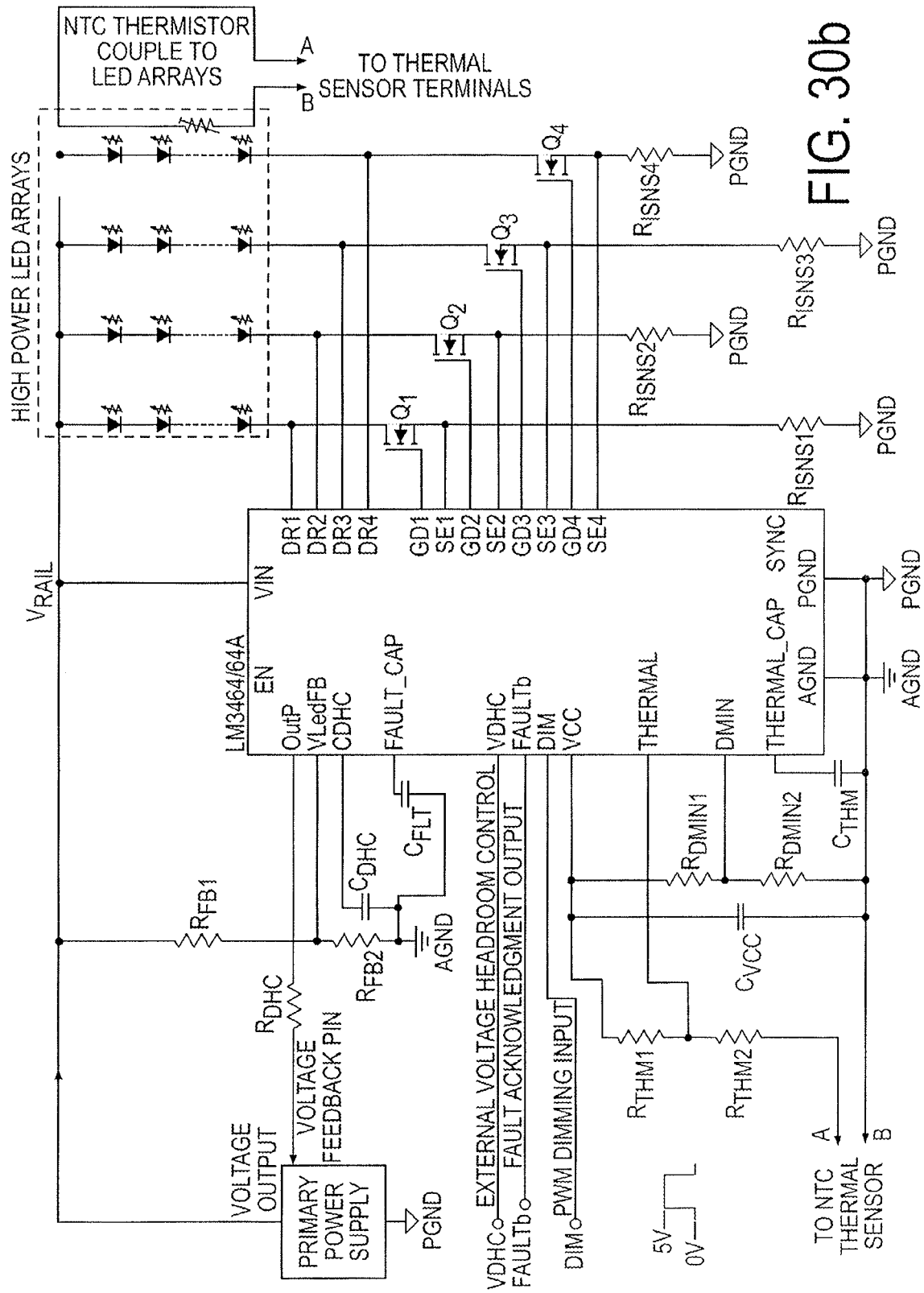
Figure 30C:
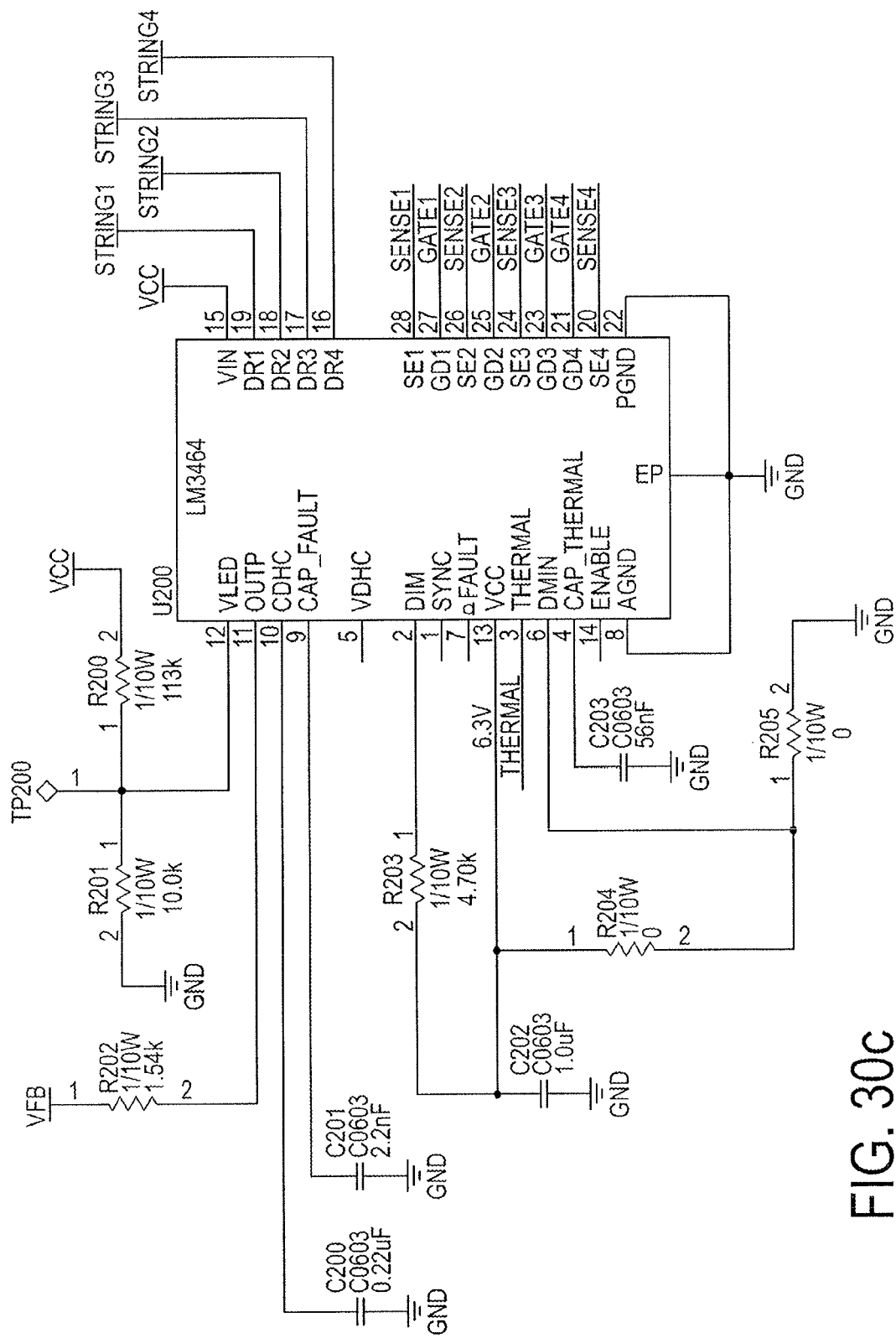
Figure 31:
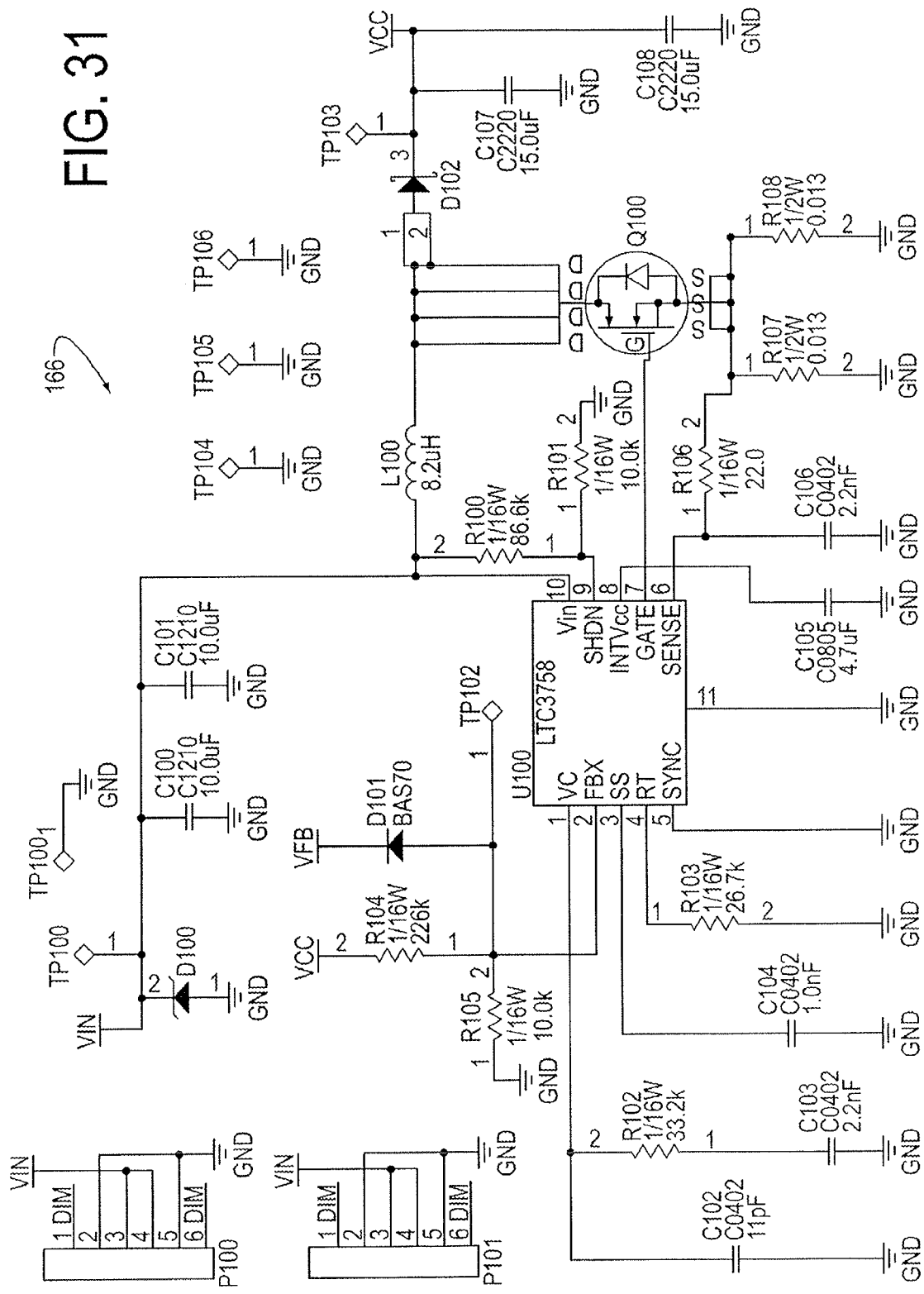

To vary the size and shape of the field illuminated by each LED, the individual lenses 170 may be varied in capability, as shown in modular lens matrices (also referred to herein as lens subassemblies) 172a and 172b in FIGS. 27 and 30, respectively. A plurality of lenses comprising at least two different types of LED lenses can be used. Preferably, LED lenses standardized by the Illumination Engineers Society of America (IESA) are employed. For example, a module 172a, 172b may comprise a plurality of Type 5 ("round") lenses 174, a plurality of Type 3 ("butterfly") lenses 176, and a plurality of Type 2 ("skinny") lenses 178. It will be apparent to the skilled artisan than many different combinations of lenses can be made. Thus because of this modular matrix lensing, a HILL assembly is provided wherein different IESA standard lens types can be provided within the same light fixture.

The lenses in the modular lens matrix can be rotated or adjusted to achieve different lighting configurations with the same HILL assembly.

In one embodiment, each HILL assembly module 142 is preferably about 12 inches long and the 64 LEDs 164 are powered to emit 64,000 lumens of light. Other suitable module lengths (in the range, for example, of 6-12 inches, 12-24 inches, 24-35 inches) will be readily apparent the skilled artisan. Modules can be used to create any desired configuration of modules, e.g., 1×2, 1×3 m 1×4 m 2×2, 2×3, 3×3, 3×4, 4×4 etc.

A currently preferred embodiment, as shown in FIG. 21, provides a 24-inch heatsink housing comprising two HILL assembly modules 142. An advantage of this design is that modular lighting can be constructed in modular sections (e.g., 12 inch sections) that can be customized in many different configurations.

Referring now to FIGS. 24, 30a, 30b, 30c, 30c(1), and 31, driver circuitry 166 allows variation of the voltage across the LED strings to a minimal value required to maintain a constant current through all four strings. This ability to vary the output voltage to a minimal value decreases the power loss of those strings that require less voltage across the LEDs. This arrangement also allows the flexibility to change the number of LEDs per string as well as the number of LED strings (1 to 4) without the need to purchase a new constant current supply as in prior art arrangement. In the present invention, this function uses a single constant voltage power supply.

In typical prior art applications, a constant current supply is utilized without the use of circuitry to vary the output voltage, meaning that the constant current power supply's output voltage just climbs to whatever voltage the highest LED string needs. The other strings that require less voltage need to dissipate the excess power created by the high voltage setting which leads to inefficient and less reliable designs. In the prior art, if the number of LEDs were to change, a new version of constant current power supply would need to be selected.

In certain embodiments, the LEDs 162 can be dimmable by pulse width modulation (PWM). Thus, the HILL assembly can also comprise pulse width modulation (PWM) circuitry. The PWM circuitry converts the 0-10V analog signal to a PWM signal.

A method for maintaining a constant LED color temperature (CCT) and/or a color rendering index (CRI) in a lighting assembly (e.g., a HILL assembly) is also provided. The method comprises the steps of using constant drive current, thereby decreasing photon emissions; and varying pulse width modulation (PWM). These steps together provide overall dimming of the light output at frequencies higher than are currently on the market. Constant CCT and CRI are maintained while dimming from 100% to 0% because of this pulse width modulation (PWM).

With PWM come the benefits of maintaining a constant LED color temperature (CCT) and color rendering index (CRI). Preferably, PWM is conducted at higher frequencies in the range of 10 kHz to 20 kHz to comply with high definition cameras/filming. The higher frequency range also allows elimination of any audible noise in applications where necessary to do so.

In a specific embodiment, pulse width modulation (PWM) can be used at a frequency of 10 GHz to 24 GHz as a method to dim the light output. This frequency range allows the light output to be dimmed at an optimal frequency that is ideal for not interfering with other visible activities, including, but not limited to high definition television recording and broadcasting. Using PWM to dim the light output maintains the Color Rendering Index (CRI) and Color Temperature (CCT) of the LED.

In certain embodiments, the HILL comprises a 0-10 V dimmer circuit. This allows the advantage of using a commercially available 0-10 V dimmer switch, but such a switch does not provide a pulse width modulation (PWM) output.

In one embodiment, the HILL assembly is preferably IEC6929 annex compliant (on board) for 0-10 V operation.

In a preferred embodiment, a HILL assembly comprises both a 0-10 V dimmer circuit and a pulse width modulation (PWM) circuit. Positioning the circuitry adjacent to, or in association with the LEDs is particularly preferred. 2) there is constant voltage 3) pulse width modulation.

5.3. Methods for Making HILL Assemblies

The HILL assemblies disclosed herein can be made using conventional manufacturing techniques known in the art. The construction of the elements of the HILL assemblies will be readily apparent to the skilled practitioner. For example, heatsinks can be produced by conventional extrusion techniques. Power supplies and circuit boards are also made using conventional methods. No special manufacturing techniques or manufacturing environments are needed to produce the assemblies.

5.4. Index for Numbered Elements

10 HILL assembly, first embodiment
12 lens (or secondary lens) element
14 CCLs
16 LED module
18 LEDs
19 frosted lip
20 first LED array
22 heatsink housing
23 groove surrounding the openings of cavity 56
24 power supply
25 concave lens surface of each CCL 14
26 convex lens surface
28 first O-ring
30 first and second thermal gaskets
32 interface plate
34 second O-ring for sealing heatsink housing 22 at the front end
36 third O-ring for sealing heatsink housing 22 at the rear end back plate
38 back plate
40 junction box
42 sealing gaskets
44 securing screws
46 circuit board or card 48 securing screws
50 bores
52 power supply connector
54 screws
56 open cavity
60 mounting bracket
62 fins of heatsink housing 22
64 ambient light sensor
66 occupancy sensor
68 spot light
70 arena/stadium light
72 linear fixture for wider angle lighting
110 HILL assembly, second embodiment
122 linear, one-piece, finned, metal heatsink housing
124 channels
126 screws
128 end plate
129 opening in end plate
130 T-slots
132 mating T-features
134 LED module
136 opposed lips
137 sealing lens
138 outer beaded fins
140 joiner 140
142 HILL assembly module
144 16-module assembly
146 power supply casing
148 bracket arm
149 bracket cover
150 power supply
151 electrical access cover
152 power supply wires
154 openings to allow venting of heated air from the fins
156 bottom panel
160 circuit board
162 LEDs
166 driver circuitry for driving the LEDs
168*a*, 168*b* first and second multi-prong connectors
170 secondary lens
172, 172*a* and 172*b* lens matrix
174 round lenses
176 butterfly lenses
178 skinny lenses
180 LED driver The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

While embodiments of the present disclosure have been particularly shown and described with reference to certain examples and features, it will be understood by one skilled in the art that various changes in detail may be effected therein without departing from the spirit and scope of the present disclosure as defined by claims that can be supported by the written description and drawings. Further, where exemplary embodiments are described with reference to a certain number of elements it will be understood that the exemplary embodiments can be practiced utilizing either less than or more than the certain number of elements.

All references cited herein are incorporated herein by reference in their entirety and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

The invention claimed is:

1. A lighting device, comprising:
   at least one lighting module, wherein the at least one lighting module comprises:
      a heatsink housing, and
      a light emitting diode (LED) module comprising a plurality of LEDs;
   a power supply disposed within a power supply casing, wherein the power supply is for providing power to one or more of the plurality of LEDs, and the power supply casing comprises structure for cooling the power supply; and
   a bracket arm that connects to the at least one lighting module and that also connects to the power supply casing.

2. The lighting device of claim 1, wherein the at least one lighting module is thermally insulated from the power supply.

3. The lighting device of claim 1, wherein the heatsink housing comprises a plurality of fins that face towards the power supply, and the LEDs of the at least one lighting module face away from the power supply.

4. The lighting device of claim 1, wherein:
   the at least one lighting module further comprises a joiner; and
   the bracket arm is configured to moveably connect to the at least one lighting module via the joiner.

5. The lighting device of claim 1, wherein the lighting device is configured for installation as at least one of the following: overhead illumination by ceiling illumination or wide area floodlighting.

6. The lighting device of claim 1, wherein the bracket arm is further configured to enclose circuitry for providing power to the one or more of the plurality of LEDs from the power supply.

7. The lighting device of claim 1, wherein the power supply comprises at least one DC power supply.

8. The lighting device of claim 1, wherein the structure for comprising the power supply comprises a plurality of fins disposed on the power supply casing.

9. The lighting device of claim 1, wherein the at least one lighting module comprises one or more modular lens matrices.

10. The lighting device of claim 3, wherein the heatsink housing further comprises an endcap that is secured to the heatsink housing and which includes at least one opening that is an intake for convectional cooling air into the heatsink housing which drives heat away from the fins of the heatsink housing.

11. The lighting device of claim 4, wherein the lighting device comprises a plurality of lighting modules that are connected to each other via the joiner.

12. The lighting device of claim 4, wherein the joiner is configured to control angular positioning of the at least one lighting module.

13. The lighting device of claim 4, wherein the at least one lighting module further comprises a circuit board and driver circuitry for driving the plurality of LEDs in communication with the circuit board.

14. The lighting device of claim 7, wherein the DC power supply comprises a DC-DC converter for converting incoming voltage from up to about 390 V to about 12 V DC operating voltage.

15. The lighting device of claim 9, wherein each of the one or more modular lens matrices comprises an array of lenses arranged in at least one of the following arrangements: a 1×2 matrix, a 1×3 matrix, a 1×4 matrix, a 2×2 matrix, a 2×3 matrix, a 3×3 matrix, a 3×4 matrix, or a 4×4 matrix.

16. The lighting device of claim 13, wherein:
the at least one lighting module comprises a plurality of parallel strings of LEDs; and
the driver circuitry is configured to provide a constant current to the at least one lighting module so that voltage delivered to each string of LEDs is automatically adjusted if any LED in the string fails.

17. The lighting device of claim 13, wherein the driver circuitry further comprises feedback circuitry for balancing power input to each of a plurality of LED strings included in the at least one lighting module.

18. The lighting device of claim 13, wherein the driver circuitry further comprises pulse width modulation circuitry configured to enable dimming of the plurality of LEDs by varying pulse width modulation.

\* \* \* \* \*